United States Patent
Fikouras et al.

(10) Patent No.: US 9,094,463 B2
(45) Date of Patent: Jul. 28, 2015

(54) TECHNIQUE FOR PERFORMING SIGNALING CONVERSION BETWEEN HTTP AND SIP DOMAINS

(75) Inventors: Ioannis Fikouras, Aachen (DE); Nikolaos Albertos Fikouras, Attika (GR); Roman Levenshteyn, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 900 days.

(21) Appl. No.: 12/919,844

(22) PCT Filed: Dec. 11, 2008

(86) PCT No.: PCT/EP2008/010539
§ 371 (c)(1),
(2), (4) Date: Dec. 3, 2010

(87) PCT Pub. No.: WO2009/106117
PCT Pub. Date: Sep. 3, 2009

(65) Prior Publication Data
US 2011/0072144 A1  Mar. 24, 2011

Related U.S. Application Data

(60) Provisional application No. 61/032,815, filed on Feb. 29, 2008.

(51) Int. Cl.
G06F 15/16 (2006.01)
H04L 29/08 (2006.01)
H04L 29/06 (2006.01)

(52) U.S. Cl.
CPC ............ *H04L 67/2823* (2013.01); *H04L 67/02* (2013.01); *H04L 67/14* (2013.01); *H04L 67/142* (2013.01); *H04L 67/28* (2013.01); *H04L 69/08* (2013.01); *H04L 65/1006* (2013.01); *H04L 65/1016* (2013.01)

(58) Field of Classification Search
CPC ................... H04L 29/06217; H04L 29/06224; H04L 29/06455; G06F 15/16
USPC ........................ 709/227, 230, 246; 725/109
See application file for complete search history.

(56) References Cited

U.S. PATENT DOCUMENTS 6,937,699 B1 *  8/2005 Schuster et al. ............. 379/67.1
2006/0056415 A1 *  3/2006 Lee et al. ..................... 370/392
(Continued)

FOREIGN PATENT DOCUMENTS

EP  1093281 A  4/2001

OTHER PUBLICATIONS

Kristol, et al., Network Working Group, Request for Comments: 2965, "HTTP State Management Mechanism," Oct. 2000.
(Continued)

*Primary Examiner* — Tesfay Yohannes

(57) ABSTRACT

A technique for performing signaling conversion between an HTTP stateful session and an SIP dialog is described. In a method realization of this technique, an HTTP request message including HTTP state information is received from an HTTP enabled entity. In response to receipt of the HTTP request message, an SIP message belonging to an SIP dialog is created. In further steps, the first SIP message is sent to an SIP enabled entity, and a mapping between the HTTP state information and the SIP dialog is established.

26 Claims, 16 Drawing Sheets

(56) References Cited

U.S. PATENT DOCUMENTS

| | | | |
|---|---|---|---|
| 2006/0268839 A1* | 11/2006 | Kato | 370/352 |
| 2007/0011191 A1 | 1/2007 | Otokawa | |
| 2007/0083675 A1* | 4/2007 | Vemulapelli et al. | 709/246 |
| 2007/0253435 A1* | 11/2007 | Keller et al. | 370/401 |
| 2008/0144655 A1* | 6/2008 | Beam et al. | 370/466 |
| 2008/0163318 A1* | 7/2008 | Chen et al. | 725/109 |
| 2008/0317000 A1* | 12/2008 | Jackson | 370/352 |
| 2008/0317004 A1* | 12/2008 | Cai et al. | 370/352 |
| 2009/0125628 A1* | 5/2009 | Dahlen | 709/227 |
| 2009/0190603 A1* | 7/2009 | Damola et al. | 370/401 |
| 2009/0217299 A1* | 8/2009 | Belluati et al. | 719/318 |

OTHER PUBLICATIONS

Berners-Lee, et al., Network Working Group, Request for Comments: 2396, "Uniform Resource Identifiers (URI): Generic Syntax," Aug. 1998.

Rosenberg, et al., Network Working Group, Request for Comments: 3261, "SIP: Session Initiation Protocol," Jun. 2002.

Handley, et al., Network Working Group, Request for Comments: 2327, "SDP: Session Description Protocol," Apr. 1998.

Rosenberg, et al., Network Working Group, Request for Comments: 3264, "An Offer/Answer Model with the Session Description Protocol (SDP)," Jun. 2002.

* cited by examiner

| Local Address | Remote Target | Local Sequence | Remote Sequence | Contact | Dialog-ID |
|---|---|---|---|---|---|
| (Local SIP URI) | (Remote SIP URI) | Index of last request issued | Index of last request received | Remote IP address | Dialog-ID of active dialog |
| ali@test | alice@home | 1 | - | 10.8.10.10 | XXXXXXXX |

| HIAF Dialog-ID | SIP Dialog-ID | Other state data |
|---|---|---|
| ali2alice1 | XXXXXXXX | |
| rita2janni1 | YYYYYYYY | |

| HIAF Dialog-ID | Transaction | Other state data |
|---|---|---|
| ali2alice1 | 00000001 | |
| rita2janni1 | 00000002 | |

| Authentication Username | Home Domain URI | Password | Authentication Scheme |
|---|---|---|---|
| Niko@home1.de | home1.de | XXX | Basic |
| Jfikouras@home1.de | home1.de | YYY | Digest |

| Authentication Username | Public User ID List | Home Domain (Realm) | IP Address | Status | Lifetime |
|---|---|---|---|---|---|
| niko_pri@home1.de | | home1.de | 192.168.1.1 | REGISTERED | 1000 |
| janni_priv@home1.de | | home1.de | 192.168.1.2 | REGISTERED | 60000 |

TECHNIQUE FOR PERFORMING SIGNALING CONVERSION BETWEEN HTTP AND SIP DOMAINS

TECHNICAL FIELD

The present invention generally relates to signaling conversion between HTTP and SIP domains. In particular, the invention is directed to a conversion technique that allows for a stateful communication between the two domains.

BACKGROUND

Today, the HyperText Transport Protocol (HTTP) constitutes the primary means for the delivery of content in the World Wide Web (WWW). HTTP is a text-based, stateless application layer protocol that defines a request/response-based message exchange mechanism between an HTTP client and an HTTP server. In the HTTP client-server model, an HTTP request is issued by an HTTP User Agent Client, while the HTTP response to the request comes from an HTTP User Agent Server.

Increasing demand for personalized WWW services has led to the development of HTTP stateful sessions comprising two or more (nominally independent) pairs of HTTP request and response messages. Currently, the dominant approaches to HTTP session administration are cookies, parameters in HTTP Universal Resource Locators (URLs) and so-called Fat URLs.

As regards cookies, the memorandum RFC2965 published by the Internet Engineering Task Force (IETF) and titled "HTTP State Management Mechanism" proposes several HTTP headers capable of conveying state information between the endpoints of an HTTP request-response message exchange. Cookies are defined as Attribute Value Pairs (AVP) of arbitrary names and values that may be accompanied by a range of predefined parameters as described in RFC2965. In a single HTTP request or response message, one or more cookies may be included as required.

An example of an HTTP request containing cookies is the following:

GET URI HTTP/1.1

Cookie: dialog-id=ali2alice1;method=bye

This HTTP request contains two cookies that collectively identify the present state of a session. The first cookie defines attribute 'dialog-id' as 'ali2alice1', while the second cookie assigns to attribute 'method' the value 'bye'.

Another possibility for keeping HTTP state information are HTTP parameters and query components. It is well known that URL schemes base their URL syntax on a nine-part general format (see RFC2396):

<scheme>: // <user> : <password>@<host> : <port>/
<path> ; <params> ? <query>#<frag>

Using this format, it is possible to convey session state information to remote network applications either as parameters or as query components. The following code listings illustrate two HTTP requests of an HTTP client to deliver session state information to an HTTP server.

Signaling session state information as URL parameters:

GET path;dialog-id=ali2alice1;method=bye HTTP/1.1
host: URI

Signaling session state information as URL query components:

GET path?dialog-id=ali2alice1&method=bye HTTP/1.1
host: URI

In both cases the HTTP server is informed that the current values for the attributes 'dialog-id' and 'method' are and 'bye', respectively.

Fat URLs are extended versions of URLs, suffixed with information used to identify the current state of an HTTP session. The following HTTP request illustrates how state information can be included in the path indication of an URL:

GET path/dialog-id=ali2alice1/method=bye HTTP/1.1
host: URI

In the above example, the HTTP client issues a request to an HTTP server who is aware that the last two path segments correspond to session state information. In this particular case, the attribute 'dialog-id' is equivalent to 'ali2alice1' and the attribute 'method' is equivalent to 'bye'.

While HTTP constitutes the primary means for content distribution in the WWW, the Session Initiation Protocol (SIP) is the primary signaling protocol on the control plane of the IMS (Internet Protocol Multimedia Subsystem) and other service provisioning networks. SIP is a text-based protocol used for authorizing user access as well as establishing, controlling and terminating media sessions between applications hosted by SIP enabled endpoints.

Similar to HTTP, SIP is based on the transmission of request and response messages. These messages are exchanged between User Agents installed on the communicating SIP endpoints. An SIP User Agent can either act as a User Agent Client (when sending a request message) or as a User Agent Server (when responding to the request message with a response message).

SIP defines that one or more media sessions between two SIP endpoints can only be established within the context of an SIP dialog. The dialog is a conceptual relation between the involved SIP endpoints that is maintained by the Transaction User Layer of the SIP Protocol Layers. In practice, a dialog is manifested as a collection of information that reflects the current state of the dialog for each endpoint. As understood herein, each SIP dialog comprises one or more SIP transactions, and each SIP transaction involves one or more messages (typically one request message and one or more response messages). In this sense, each SIP message can be regarded as part of an SIP transaction.

Each SIP dialog is identified by an identifier (the so-called dialog-ID) that is formed by a number of attributes negotiated between the SIP endpoints during initiation of a session and remaining valid for the lifetime of the dialog. Specifically, the dialog-ID of a dialog between a User Agent Client and a User Agent Server (the two endpoints of a SIP dialog) is defined as:

Dialog (-ID)=Call-ID, local tag (To-header tag of dialog response), remote tag (From-header tag of dialog request)

SIP and SIP's Universal Resource Identifiers (URIs) follow the guidelines set by RFC2396. The general form of a SIP URI as defined in RFC3261 has the following syntax:

sip:user:password@host:port;uri-parameters?headers

The SIP URI structure allows for the inclusion of several parameters and headers within its generic form.

While HTTP is the standard protocol for the delivery of content in the WWW, there currently exists no documented or implemented solution that would allow HTTP enabled user equipment to initiate, conduct and terminate sessions with an SIP User Agent.

SUMMARY

Accordingly, there is a need for enabling an efficient signaling conversion between HTTP and SIP domains that preserves the session concept.

According to a first aspect, a method of performing signaling conversion between an HTTP stateful session and an SIP dialog is provided, which comprises receiving from an HTTP enabled entity a first HTTP request message, the first HTTP request message including HTTP state information; creating a first SIP message in response to receipt of the first HTTP request message, the first SIP message belonging to an SIP dialog; sending the first SIP message to an SIP enabled entity; and establishing a mapping between the HTTP state information and the SIP dialog.

The HTTP state information may have any format and content. In one implementation, the HTTP state information takes the form of a string of alphanumerical characters that is unique at least locally (e.g., among the network components controlling the message transfer described herein).

The mapping between the HTTP state information and the SIP dialog may be performed at an interface between an HTTP domain comprising one or more HTTP enabled entities and an SIP domain comprising one or more SIP enabled entities. Specifically, the mapping may be used to bind session-related signaling originating or terminating in the SIP domain to session-related signaling originating or terminating in the HTTP domain. To this end, the mapping may be established, consulted and/or updated each time a message intended for the SIP domain arrives from the HTTP domain, and vice versa. As a result, the mapping may form the basis for any HTTP enabled entity to initiate, accept, conduct and terminate one or more sessions with an SIP enabled entity (e.g., an IMS enabled entity such as an IMS subscriber or an IMS application server), and vice versa.

The techniques discussed herein may be performed in context with an SIP dialog that has already been established (e.g., for which one or more messages have already been exchanged between the HTTP enabled entity and the SIP enabled entity). Alternatively, the techniques may also be performed in context with an SIP dialog that is about to be established (e.g., for which only the HTTP enabled entity or the SIP enabled entity has thus far transmitted a message with the purpose of establishing a dialog).

As stated above, the first SIP message is created in response to receipt of the first HTTP request message. Further in response to receipt of the first HTTP request message, a first HTTP response message may be sent to the HTTP enabled entity. The first HTTP response message may optionally include or reference the HTTP state information received via the first HTTP request message.

The method may further comprise the steps of receiving a second SIP message; determining the SIP dialog to which the second SIP message belongs; determining the HTTP state information associated with the SIP dialog; generating a second HTTP request message including or referencing the HTTP state information thus determined; and sending the second HTTP request message to the HTTP enabled entity.

Additionally, a second HTTP response message responsive to the second HTTP request message may be received from the HTTP enabled entity. The second HTTP response message may optionally include or reference the HTTP state information.

Based on the HTTP state information, the pair of first HTTP request and response messages as well as the pair of second HTTP request and response messages may be grouped into an HTTP stateful session. In other words, by associating the HTTP state information (or information uniquely derived therefrom or referencing the same) with two or more pairs of HTTP request and response messages, the message pairs may be classified as belonging to one specific session stretching between the HTTP domain and the SIP domain.

The first or any later HTTP request message may further include address information indicative of an SIP User Agent of the SIP enabled entity. The address information included in the first HTTP request message may be used to address the first SIP message to the SIP User Agent. To this end, the address information may be written (e.g., copied) into the first SIP message.

The first or any later HTTP request message may further include HTTP dialog information. The HTTP dialog information and the SIP dialog information may each uniquely identify one specific session-related dialog between at least one HTTP enabled entity and at least one SIP enabled entity. In some cases, one and the same identifier may simultaneously constitute the HTTP dialog information and the SIP dialog information, so that a mapping would become obsolete and a simple storing of this identifier would suffice. Together with the HTTP and/or SIP dialog information, information about the current state of the specific dialog may be stored. This approach permits to look-up the current state of any dialog based on the HTTP and/or SIP dialog information. Such a look-up may be performed in context with the construction of one or more SIP messages for continuing, modifying or terminating the dialog.

According to a still further possibility, the first or any later HTTP request message may include session description information such as information according to the Session Description Protocol (SDP) standard. The session description information may, for example, be sent in an SDP offer/answer context. In the case the first HTTP request message includes session description information, this information may be forwarded via the first SIP message to the SIP enabled entity. In other words, the session description information received via the first HTTP request message may be included (e.g., copied) into the first SIP message.

There exist various possibilities for inserting HTTP state information in at least one of the first HTTP request message and the second HTTP request message. According to a first variant, HTTP cookies are used for conveying state information. According to a second variant, state information in the form of a Fat URL is transmitted. As a still further variant, the utilization of HTTP parameters and query components can be mentioned. Two or more of these variants can be combined as needed.

The first HTTP request message may include an SIP message indication that permits the recipient of the first HTTP request message to identify the type of SIP message that is to be created. The SIP message indication may directly or indirectly refer to any SIP method such as INVITE, ACK, BYE, CANCEL, OPTIONS, REGISTER and INFO. According to another variant, the SIP message indication may directly or indirectly refer to an SIP code such as any one of the following (or other) response codes: 1xx Informational (e.g., 100 Trying, 180 Ringing), 2xx Successful (e.g., 200 OK, 202 Accepted), 3xx Re-Direction, 4xx Request Failure, 5xx Server Failure, and 6xx Global Failure. According to a still further variant, the SIP message indication may directly or indirectly refer to an HTTP status code that can be translated into a corresponding SIP code or SIP method.

According to a further aspect, a method of performing signaling conversion between an SIP dialog and an HTTP stateful session is provided, which comprises receiving from an SIP enabled entity a first SIP message, the first SIP message belonging to an SIP dialog; establishing a mapping between HTTP state information and the SIP dialog; creating a first HTTP request message indicative of a content of the first SIP message, the first HTTP request message including the HTTP state information that is mapped on the SIP dialog; and sending the first HTTP request message to an HTTP enabled entity.

The method may further comprise receiving a first HTTP response message responsive to the first HTTP request message from the HTTP enabled entity. The first HTTP response message may optionally include or reference the HTTP state information received by the HTTP enabled entity via the first HTTP request message.

Still further, the method may comprise the steps of receiving a second HTTP request message including the HTTP state information and, optionally, including an SIP message indication indicative of a second SIP message that is to be created; determining the SIP dialog mapped on the HTTP state information; creating a second SIP message in response to receipt of a second HTTP request message based on the determined SIP dialog (and optionally based on the SIP message indication if available); and sending the second SIP message to the SIP enabled entity. Moreover, a second HTTP response message may be returned to the HTTP enabled entity in response to the second HTTP request message. The second HTTP response message may optionally include or reference the HTTP state information.

Based on the HTTP state information, the pair of first HTTP request and response messages as well as the pair of second HTTP request and response messages may be grouped into the HTTP stateful session. In other words, while HTTP as such is stateless, the inclusion of the HTTP state information in at least the HTTP request messages (and optionally also in the corresponding response messages) permits to extend the stateful session paradigm from the SIP domain into the HTTP domain.

The HTTP state information may be generated (e.g., in response to receipt of the first SIP message) by any of the network components involved in the message exchange. If, for example, the session is initiated from the HTTP domain (i.e., by an HTTP enabled entity), the HTTP state information may be generated by the HTTP enabled entity and transmitted with the first HTTP request message. If, on the other hand, the session is initiated from the SIP domain (i.e., by an SIP enabled entity), the HTTP state information may be generated by the network component establishing the mapping between the HTTP state information and the SIP dialog. Of course, there exist various further possibilities how and where the HTTP state information can be generated.

The HTTP enabled entity participating in the message transfer described herein may take the form of any user equipment, such as a mobile telephone, a personal digital assistant, a personal computer, a laptop, a network or data card and so on. The SIP enabled entity may be an IMS entity such as an IMS application server or an IMS enabled user equipment.

The SIP dialog performed between the HTTP enabled entity and the SIP enabled entity may be performed in any SIP messaging context. Possible SIP messaging contexts include a user registration context, a session initiation context and a session termination context.

According to another aspect, a computer program product is provided. The computer program product comprises program code portions for performing one or more of the steps of one or more of the methods described herein when the computer program product is executed on one or more computing devices. The computer program to product may be stored on a computer-readable recording medium such as a permanent or re-writable memory, a CD-ROM, or a DVD. The computer program product may also be provided for download via one or more computer networks such as the Internet, a cellular telecommunications network or a wireless or wired Local Area Network (LAN).

According to a still further aspect, an apparatus for performing signaling conversion between an HTTP stateful session and an SIP dialog is provided. The apparatus comprises an HTTP User Agent adapted to receive from an HTTP enabled entity a first HTTP request message, the first HTTP request message including HTTP state information; an SIP User Agent adapted to send a first SIP message to an SIP enabled entity in response to receipt of the first HTTP request message, the first SIP message belonging to an SIP dialog; and a mapping logic adapted to establish a mapping between the HTTP state information and the SIP dialog. The apparatus may be configured to perform any of the method aspects discussed herein.

The SIP User Agent or another component of the apparatus may be configured to also create the first SIP message. Further, the HTTP User Agent may be adapted to return a first HTTP response message to the HTTP enabled entity.

A further apparatus for performing signaling conversion between an SIP dialog and an HTTP stateful session comprises an SIP User Agent adapted to receive from an SIP enabled entity a first SIP message, the first SIP message belonging to an SIP dialog; a mapping logic adapted to establish a mapping between HTTP state information and the SIP dialog; and an HTTP User Agent adapted to send a first HTTP request message indicative of a content of the first SIP message to an HTTP enabled entity, the first HTTP request message including or referencing the HTTP state information mapped on the SIP dialog. The apparatus may be configured to perform any of the method aspects discussed herein.

The HTTP User Agent or another component of the apparatus may be adapted to also create the first HTTP request message. The HTTP User Agent may further be adapted to receive a first HTTP response message responsive to the first HTTP request message from the HTTP enabled entity.

Any of the apparatuses described herein may be configured as an intermediate network node interfacing (or bridging) an HTTP domain on the one side and an SIP domain on the other. In one possible implementation, the apparatus is configured as a Web proxy.

BRIEF DESCRIPTION OF THE DRAWINGS

In the following, the present invention will be described in more detail with reference to exemplary embodiments illustrated in the drawings, wherein FIG. 1 schematically illustrates a network infrastructure comprising a network node embodiment;

FIG. 6 illustrates an embodiment of a dialog state table as maintained by the network node shown in FIG. 4;

FIG. 7 illustrates an embodiment of a dialog resolution table;

FIG. 8 illustrates an embodiment of a transaction counter table;

FIG. 15 illustrates an embodiment of a subscriber table;

FIG. 16 illustrates an embodiment of a registration table.

DETAILED DESCRIPTION

In the following description, for purposes of explanation and not limitation, specific details are set forth such as specific network configurations and specific signaling scenarios in order to provide a thorough understanding of the techniques disclosed herein. It will be apparent to one skilled in the art that the techniques may be practised in other embodiments that depart from these specific details. For example, the skilled artisan will appreciate that the techniques discussed herein may be practised in combination with other network configurations and different signaling steps. Moreover, while the following embodiments will primarily be described in relation to SIP enabled IMS entities, it will be readily apparent that the techniques described herein may also be practised in context with SIP enabled entities that are not compliant with the IMS standard.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that, while the following embodiments will primarily be described in the form of methods and apparatuses, the techniques disclosed herein may also be embodied in a computer processor and a memory coupled to the processor, wherein the memory is encoded with one or more programs that perform the steps discussed herein when executed by the processor.

Figure 1:
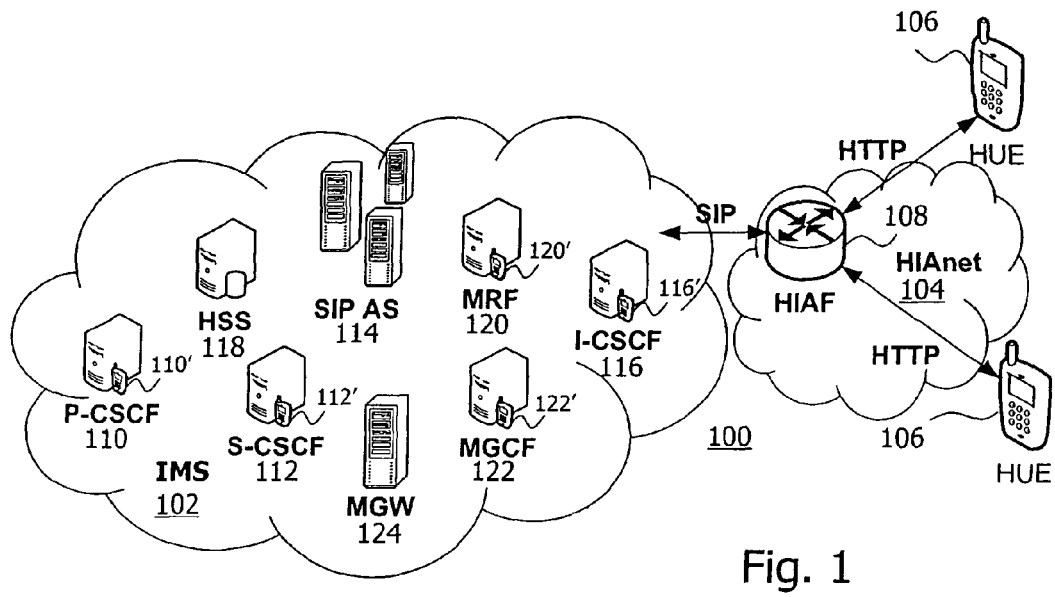

Reference is now made to FIG. 1, which shows an exemplary network architecture 100 in which the various techniques described herein may be implemented. The network architecture 100 comprises an IMS network 102, an HTTP-to-IMS Access network (HIAnet) 104 and several items of HTTP enabled User Equipment (HUE) 106. In the exemplary scenario illustrated in FIG. 1, the HUEs 106 are configured as mobile telephones.

The HIAnet 104 provides a central network node hosting a so-called HTTP-to-IMS Access Function (HIAF) 108. The HIAF 108 serves the various HUEs 106 via HTTP-based network links and at the same time maintains an SIP-based network link to the IMS network 102. The HIAF 108 thus interfaces or intervenes between the plurality of HUEs 106 on the one side and the IMS network 102 on the other side.

The IMS network 102 comprises a plurality of network nodes distributed over an application plane, a control plane and a transport plane. The control plane includes a plurality of SIP servers and SIP proxys that are collectively called Call Session Control Functions (CSCF) and that are used to process SIP signaling. A Proxy CSCF (P-CSCF) 110 is a SIP proxy constituting the first point of contact for external IMS enabled entities such as mobile telephones. The P-CSCF 110 is assigned to an IMS enabled entity during registration and provides authentication services. A Serving CSCF (S-CSCF) 112 is the central node of the control plane. It is a SIP server but also performs session control. The main tasks of the S-CSCF 112 include the handling of SIP registrations and the selection of an Application Server (AS) 114 that is to provide a requested service. An Interrogating CSCF (I-CSCF) 116 is another SIP function configured to query a Home Subscriber Server (HSS) 118 in response to receipt of an SIP request, and to route the received SIP request to the assigned S-CSCF 112 based on the information retrieved from the HSS 118.

On the application layer, the one or more ASs 114 host and execute services, including voice, data and multimedia services. The ASs 114 interface with the S-CSCF 112 via SIP signaling. The HSS 118 is a further application layer component maintaining subscription-related information (user profiles), and participating in authentication and authorization processes. The Media Resource Function (MRF) 120 is a media server that provides media-related functions including media manipulation (e.g., voice stream mixing).

A Media Gateway Controller Function (MGCF) 122 is a Public Switched Telephone Network (PSTN) gateway in charge of call control protocol conversion between SIP and the ISDN User Part (ISUP) protocol. A Media Gateway (MGW) 124 is a further PSTN gateway that is located on the transport layer and interfaces with the media plane of the PSTN by performing protocol conversion between the Real-time Transport Protocol (RTP) as used in the IMS network 102 and Pulse-Code Modulation (PCM) as used in the circuit-switched PSTNs.

The IMS network 102 further comprises SIP enabled user equipment 110', 112', 116', 122', 124' including mobile telephones (as schematically illustrated in FIG. 1, for example in connection with the S-CSCF 112). Basically, the configuration and operation of the individual IMS components discussed above is well-known to the person skilled in the art, and for this reason a more detailed discussion thereof will be omitted here unless necessary in order to understand the communication between the IMS network 102 and the HIAF 108 of HIAnet 104.

As mentioned above, the HIAF 108 constitutes the central network node of the HIAnet 104. The HIAF 108 operates as a Web proxy and intercepts HTTP requests generated by the HUEs 106. The network address of the HIAF 108 may be statically preconfigured, or it may be dynamically discovered as will be described in more detail below.

The basic task of the HIAF 108 is to enable an interaction between the HUEs 106 on the one hand and the IMS network 102 on the other. This interaction includes the initiation, acception and termination of multimedia sessions with SIP enabled IMS entities including IMS subscribers (i.e., IMS enabled user equipment) and IMS ASs 114. The HIAF 108 is configured to establish, update and terminate mappings between SIP dialogs and HTTP state information (i.e., HTTP stateful sessions). Based on these mappings, the HIAF 108 additionally performs signaling conversion that permits the HUEs 106 to initiate media sessions towards IMS entities, and to be the target of media sessions initiated by IMS entities.

Figure 2:
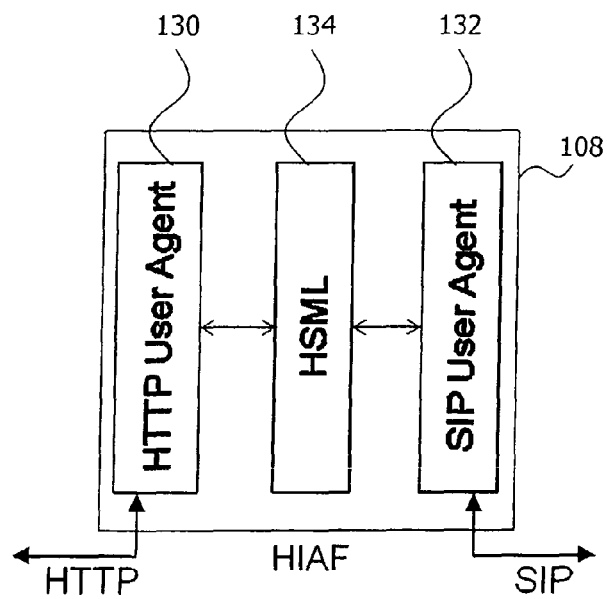
FIG. 2 is a block diagram illustrating internal components of the network node embodiment.

FIG. 2 illustrates the internal configuration of the HIAF 108. The HIAF 108 hosts an HTTP User Agent Client (HUAC) and Server (HUAS) in a function collectively called HTTP User Agent (HUA) 130. The HUAC issues HTTP requests and receives HTTP responses, while the HUAS receives HTTP requests and returns HTTP responses. The HIAF 108 further comprises an SIP User Agent Client and an SIP User Agent Server hosted in a function collectively called SIP User Agent 132. The SIP User Agent Client issues SIP requests and receives SIP responses, and the SIP User Agent Server receives SIP requests and returns SIP responses.

The HTTP User Agent 130 constitutes an endpoint of HTTP messaging, while the SIP User Agent 132 constitutes an endpoint for SIP messaging. A function called HTTP-to-SIP Mapping Logic (HSML) 134 is coupled between the HTTP User Agent 130 and the SIP User Agent 132. The HSML 134 is in charge of establishing (e.g., determining, creating, updating or deleting) state information for HTTP and SIP sessions and additionally performs signaling conversion between them. Specifically, in the HSML 134 each SIP message may be associated with and translated into an HTTP request-response message pair and vice versa. The resulting signaling pattern is illustrated in FIG. 3.

Figure 3:
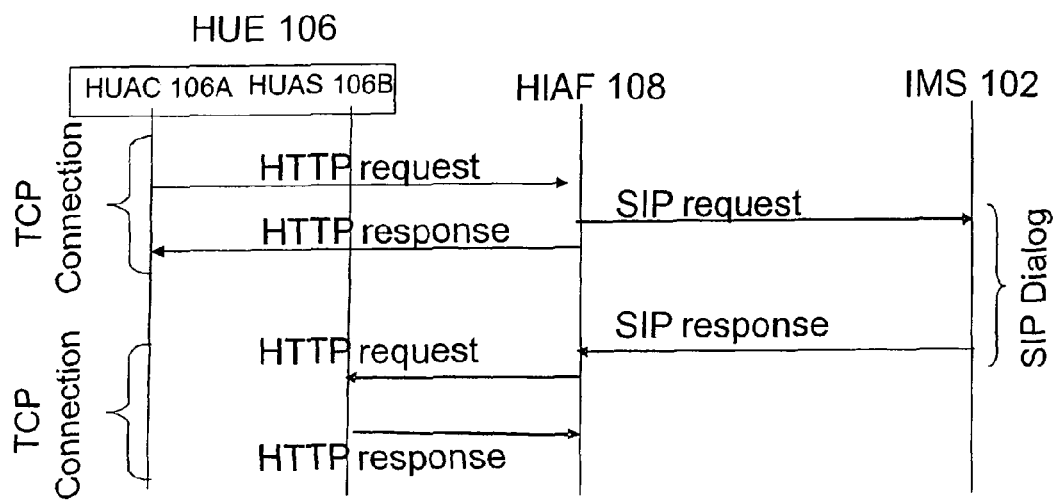
FIG. 3 is a schematic signaling diagram illustrating a basic signaling mechanism involving the network node embodiment of FIG. 2.

FIG. 3 illustrates the HTTP-based message exchange between one HUE 106 and the HIAF 108. Also shown are the associated SIP messages sent by the HIAF 108 towards the IMS network 102. In a similar manner as the HIAF 108, the HUE 106 comprises a HUAC 106A and a HUAS 106B. The HIAF 108 is bound to a predefined Transmission Control Protocol (TCP) port number known to all HUEs 106.

As is well-known, HTTP is a stateless protocol in which for each pair of request and response messages a new TCP connection is opened (as shown on the left-hand side of FIG. 3). In the present embodiment, HTTP state information is transported with at least one message of each request and response message pair. By identifying similar or interrelated HTTP state information in messages belonging to different HTTP request and response message pairs (i.e., to different TCP connections), the individual request and response message pairs can be grouped to a single stateful HTTP session.

The HIAF 108 additionally establishes (e.g., generates and/or maintains) a mapping between an SIP dialog (involving one SIP request message and one SIP response message in the exemplary scenario shown on the right-hand side of FIG. 3) and the HTTP state information included in the two HTTP request and response message pairs of FIG. 3. In this manner, an association between the stateful HTTP session and the SIP session to which the SIP dialog relates is brought about. As a result, and despite the inherent statelessness of HTTP, the HUE 106 can initiate sessions towards IMS entities and also be the target of sessions initiated by IMS entities.

The HTTP messages illustrated in FIG. 3 are processed by the HTTP User Agent 130 of the HIAF 108 shown in FIG. 2. The internal software configuration of the HTTP User Agent 130 is schematically illustrated in FIG. 4.

Figure 4:
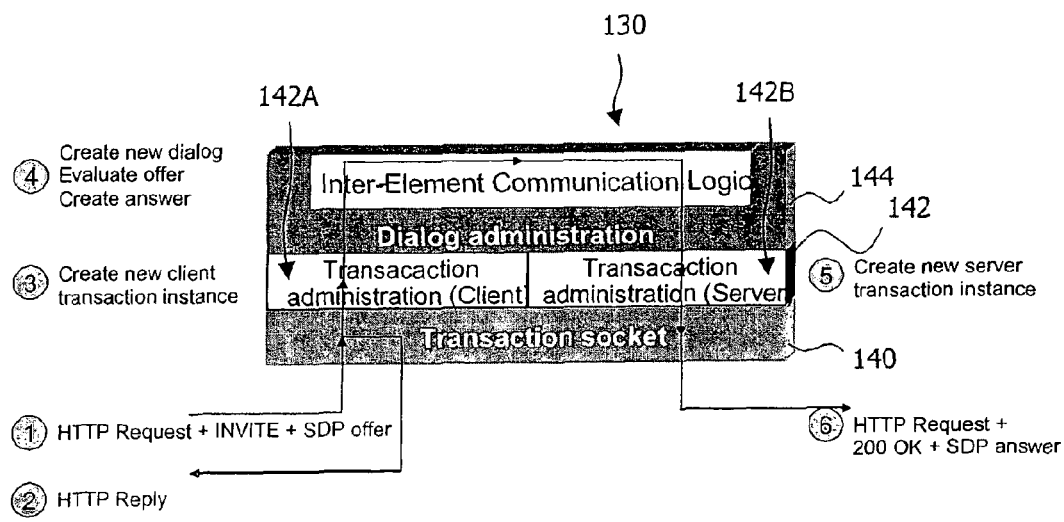
FIG. 4 schematically illustrates the software architecture of an exemplary HTTP User Agent component of the network node embodiment illustrated in FIG. 2.

As shown in FIG. 4, the HTTP User Agent 130 comprises three distinct layers, namely a transaction socket layer 140, a transaction administration layer 142 and a dialog administration layer 144. Conceptually, independent client and server components 142A, 142B within the HTTP User Agent 130 share the same transaction socket layer 140 but are separate entities on the transaction administration layer 142. The dialog administration layer 144 spans over both components 142A, 142B of the transaction administration layer 142.

The transaction socket layer 140 and the transaction administration layer 142 are configured to perform transaction-based processing operations. A transaction typically comprises the exchange of a single SIP request message and one or more related SIP response messages as part of an SIP dialog. Each SIP dialog, in turn, includes one or more individual transactions (such as INVITE transactions, non-INVITE transactions and ACK requests, that constitute their own transaction).

As already mentioned, individual SIP request and response messages are mapped onto separate HTTP request and response message pairs based on HTTP state information. It is the purpose of the transaction socket layer 140 to exploit the mapping in context with utilizing the HTTP state information included within HTTP request and response pairs in order to match each HTTP request message (containing, for example, an SIP transaction request) with its associated HTTP response message. In addition, the transaction socket layer 140 handles HTTP timeouts and retransmissions. For this purpose, the transaction socket layer 140 implements a separate state machine depending on the required type of transaction administration component (client 142A or server 142B) and the transaction type (e.g., INVITE or non-INVITE transaction).

The transaction administration layer 142 is arranged above the transaction socket layer 140 and is responsible for creating (or initiating) and cancelling SIP transactions belonging to individual SIP dialogs. The dialog administration layer 144 maintains state information for each established SIP dialog. In addition, the dialog administration layer 144 comprises inter-element communication logic that intervenes between the client and server components 142A, 142B of each HTTP User Agent 130 and administers the whole stack of software layers.

Figure 5:
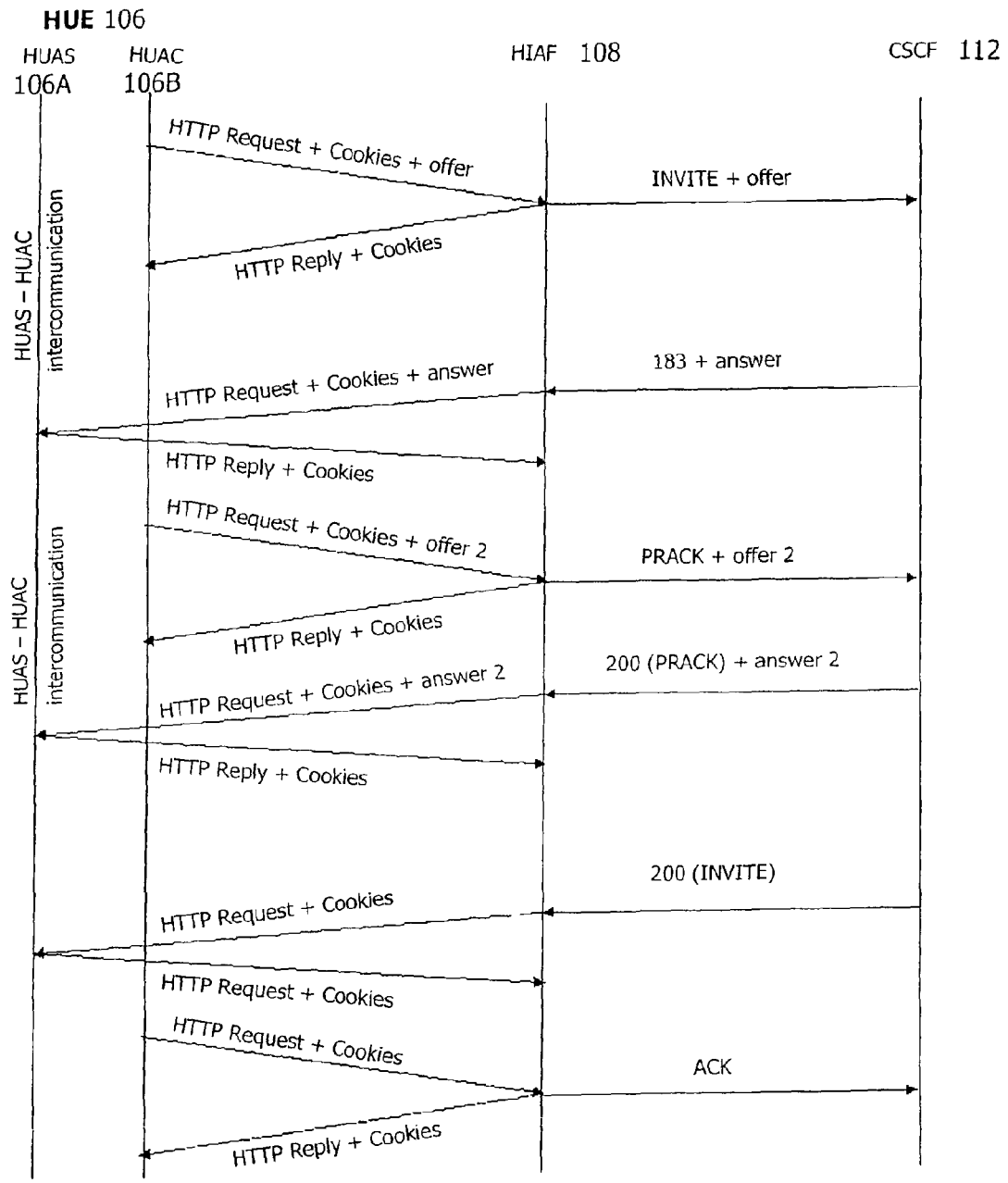
FIG. 5 is a schematic signaling diagram illustrating session initiation signaling.

In the following, the cooperation of the individual software layers 140, 142 and 144 illustrated in FIG. 4 will exemplarily be discussed in context with the schematic signaling diagram illustrated in FIG. 5. In the messaging scenario of FIG. 5, the HUE 106 initiates an INVITE transaction. To this end, the HUAC 106B of HUE 106 issues a first HTTP request message as shown in FIG. 5 (step 1 in FIG. 4). The HTTP request message contains various items of information including HTTP state information, an SIP message indication in the form of a transaction request (INVITE) and session description information (in the form of an SDP offer). The HTTP state information is transmitted as a cookie in the header of the HTTP request message. The SIP message indication and the SDP-compliant session description information, on the other hand, are carried in the body of the HTTP request message.

The Session Description Protocol, or SDP, is described in RFC2327 and defines a syntax for describing the multimedia sessions with the information required in order to participate in that session. Session descriptions may be sent using arbitrary existing application protocols for transport.

The offer/answer model as defined in RFC3264 enables endpoints to use SDP in order to obtain a shared view of a session. Some session parameters are negotiated (e.g., codecs to use), while others are simply communicated from one endpoint to the other (e.g., IP addresses). According to the SDP offer/answer model, a communication endpoint (the 'offerer') generates an SDP message that constitutes the offer. The offer needs to be conveyed to the other endpoint (the 'answerer'). The answerer generates an answer, which is an SDP message that responds to the offer submitted by the offerer. The answer has a matching media stream for each stream in the offer, indicating whether the stream is accepted or not. The SDP offer/answer model does not define a specific means of transportation for delivering SDP messages between endpoints.

The HTTP state information received with the first HTTP request message of FIG. 5 is conveyed from the HUAC 106B to the HIAF 108 in the exemplary form of a cookie. It will be appreciated that other mechanisms for transferring the HTTP state information (such as Fat URLs or URI parameters) could alternatively or additionally be utilized.

The HTTP request message from the HUAC 106B is received at the transaction socket layer 140 of the HTTP User Agent 130 of HIAF 108. On the transaction socket layer 140, the HTTP request message is processed, and a HTTP response message responsive to the HTTP request message is returned to the HUAC 106B as shown in FIG. 5 (step 2 in FIG. 4). The HTTP response message may optionally include the received HTTP state information (e.g., in the form of a cookie).

Then, the transaction request, the SDP offer and the HTTP state information are passed from the transaction socket layer 140 to the client component 142A of the transaction administration layer 142. Responsive to receipt of these items, the client component 142A creates a new client transaction instance (step 3 in FIG. 4). After creation of the new client transaction instance, a new SIP dialog instance is created on the dialog administration layer 144 (step 4 in FIG. 4) and an SIP request message (INVITE message) including the SDP offer is sent to the IMS network (i.e., to the S-CSCF 112) as shown in FIG. 5 to initiate the required SIP session.

Responsive to receipt of the SIP request message (INVITE) including the SDP offer, the S-CSCF 112 returns an SIP response message with the response code 183 and an SDP answer as shown in FIG. 5. Upon receipt of the SDP response message, the inter-element communication logic within the dialog administration layer 144 instructs the server component 142B of the transaction administration layer 142 to create a new server transaction instance (step 5 in FIG. 4) and to deliver the SDP answer received from the S-CSCF 112 along with the response code to the transaction socket layer 140.

The transaction socket layer 140 constructs a new HTTP request message carrying the response code, the SDP answer as well as a cookie with the HTTP state information as received from the HUE 106 with the first HTTP request message. The newly created HTTP request message is then sent in a next step to the HUAS 106A of HUE 106 as shown in FIG. 5 (step 6 in FIG. 4). Responsive to receipt of the HTTP request the HUAS 106A returns a HTTP response message to the HIAF 108 as also shown in FIG. 5.

Since the same (or uniquely associable) HTTP state information is included in both the first HTTP request message sent from the HUAC 106B to the HIAF 108 and the second HTTP request message sent from the HIAF 108 to the HUAS 106A, the HUE 106 and the HIAF 108 can group the two nominally independent HTTP request and response message pairs into an HTTP session corresponding to an SIP dialog in the form of an INVITE transaction. In addition, this HTTP state management mechanism can also be used to map HTTP request and response messages on extra-dialog SIP signaling such as registration requests and responses.

In case the HUE 106 determines based on the SDP answer that certain parameters (e.g., media-related parameters or terminal capability-related parameters) need to be re-negotiated, the messaging pattern discussed above may repeat itself when the HUAC 106B sends a new HTTP request message to the HIAF 108 offering to renegotiate (see FIG. 5). Responsive to this new HTTP request message, the HIAF 108 constructs a PRACK message with a new offer and sends this message to the S-CSCF 112. The S-CSCF 112 answers the PRACK message with a 200 OK message. Then, and still referring to FIG. 5, the S-CSCF 112 sends a 200 (INVITE) message via the HIAF 108 to the HUE 106 and receives an ACK message as response.

During the various dialogs performed in context with the signaling illustrated in FIG. 5, the dialog administration layer 144 of the HTTP User Agent 130 illustrated in FIG. 4 keeps track of all active dialogs. To this end, the dialog administration layer 144 maintains a dialog state table 600 as illustrated in FIG. 6. The dialog state table 600 comprises the following columns. In the first column, the local address in the form of the local SIP URI used in the particular dialog is stored. The second column identifies the remote target (i.e., the S-CSCF 112) by its SIP URI. The third column indicates the local sequence, which is the index number of the last SIP request message sent for the specific dialog. In the fourth column, the remote sequence indicates the index number of the last SIP request message received. The contact column indicates the IP address of the remote endpoint (this column is important only for inter-HIAnet communication without the intervention of the HIAF 108). In the dialog ID column, each SIP dialog is given a locally unique identifier.

In the scenario illustrated in FIGS. 4 and 5, it is assumed that the HIAF 108 is capable of conducting the SDP offer/answer model with the remote SIP endpoint (via the S-CSCF 112). Alternatively, the SDP offer/answer model could also be conducted directly between the HUE 106 and the remote SIP endpoint. To this end, the SDP message may be included in the message body of the HTTP request and response messages sent and received by the HUE 106.

Having described the general messaging concept between the HUE 106 and the S-CSCF 112 under control of the HIAF 108, the state management mechanism performed by the HSML 134 of the HIAF 108 (see FIG. 2) will now be described in more detail to provide a better understanding of how the mapping of SIP dialogs onto HTTP stateful sessions (i.e., HTTP state information) may be realized. As explained above, this mapping is exploited to group multiple pairs of HTTP request and response messages into HTTP stateful sessions corresponding to SIP transactions that belong to SIP dialogs.

Figure 9A:
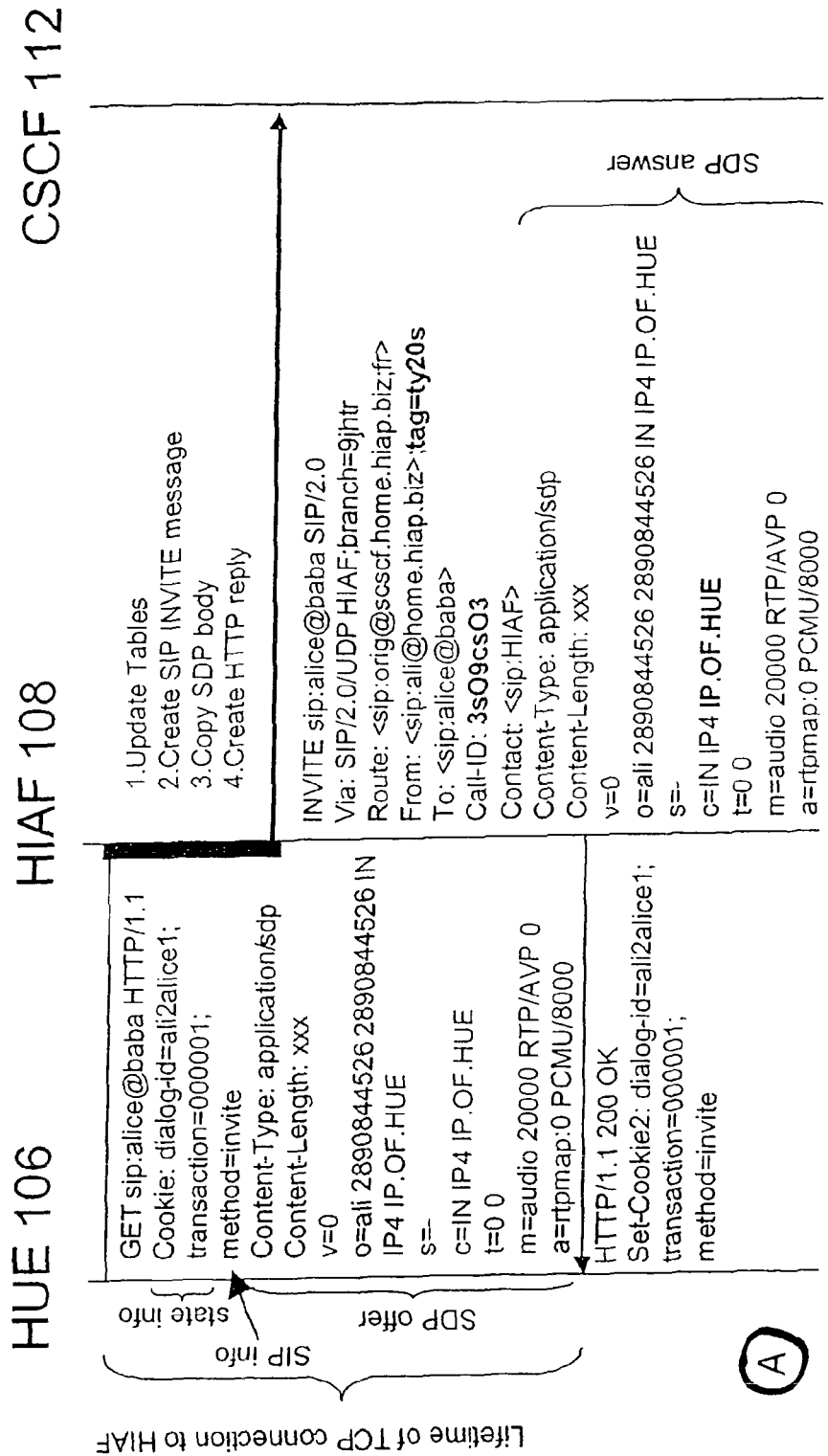
FIG. 9 is a schematic signaling diagram illustrating in more detail some aspects of session initiation signaling.
Figure 9B:
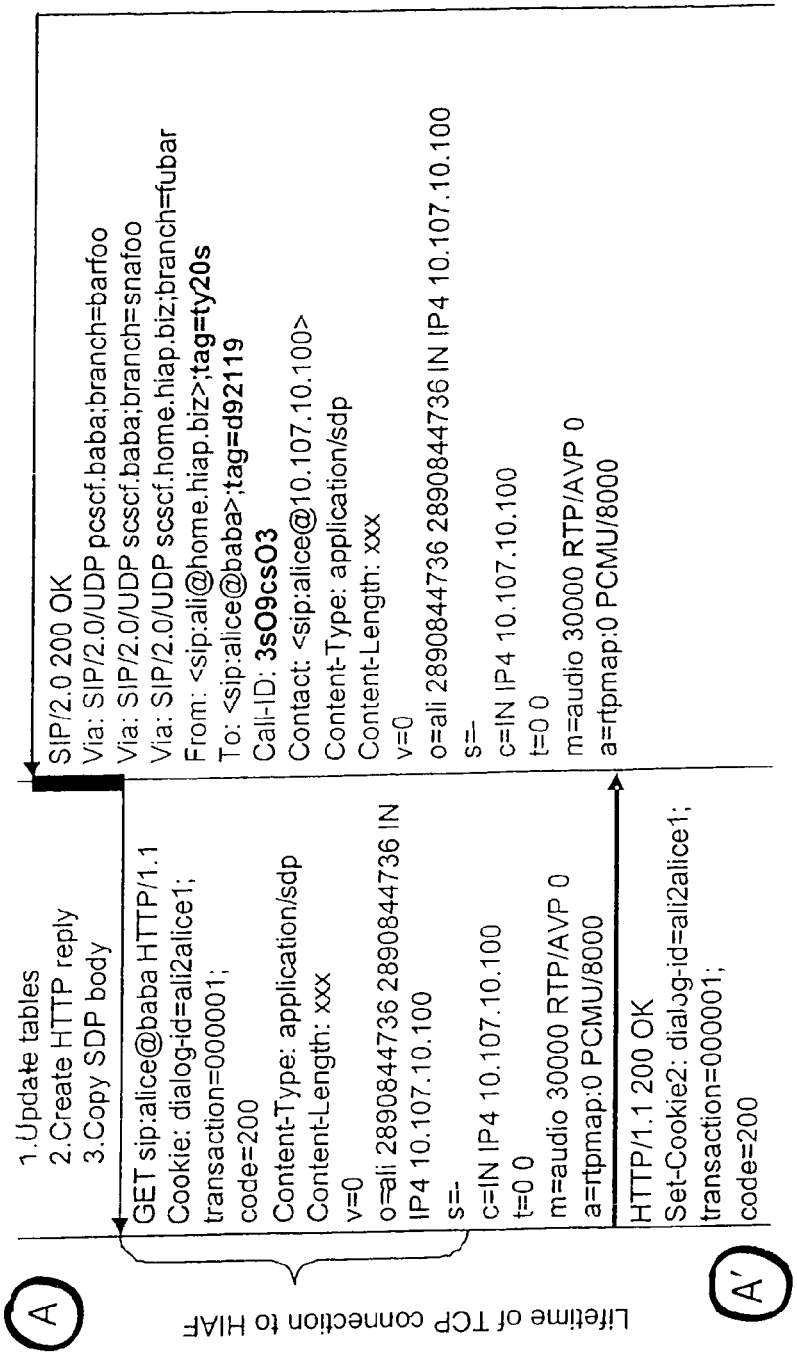
Figure 9C:
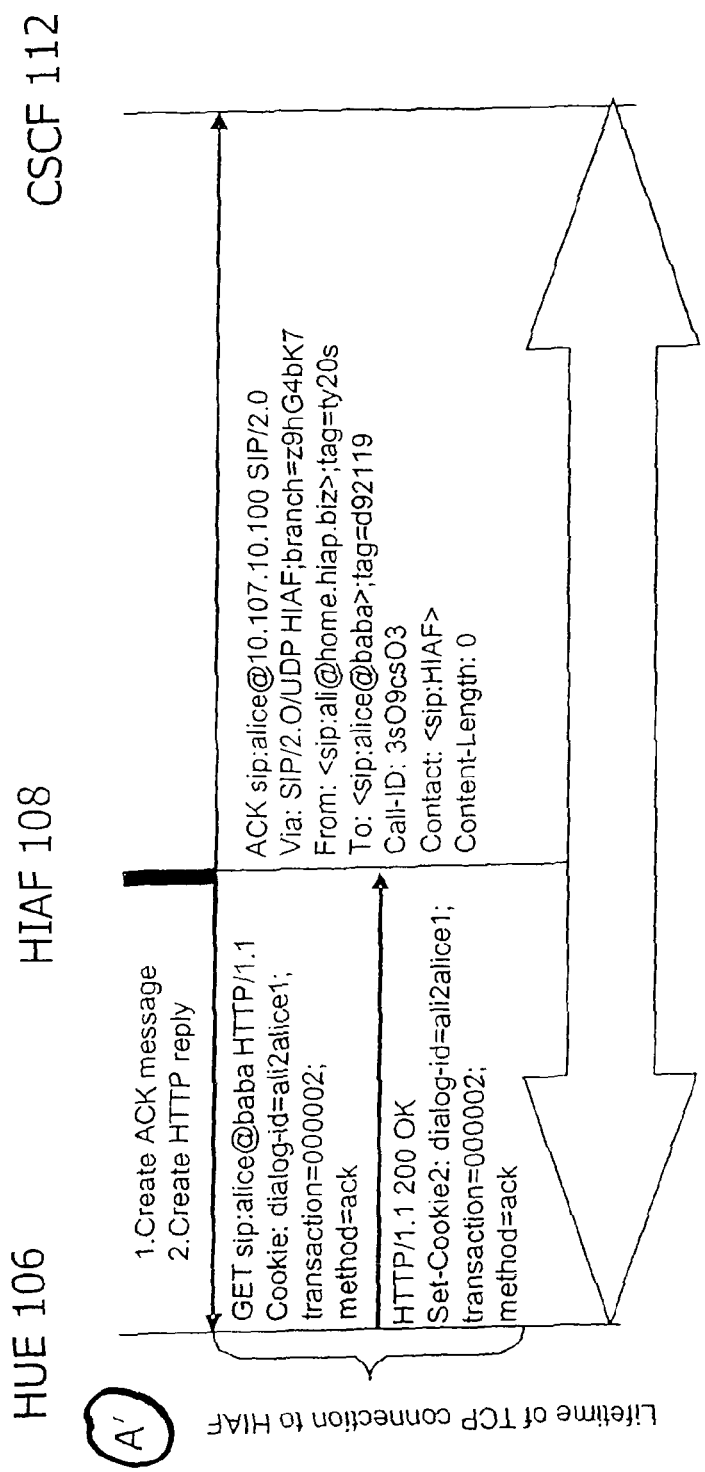

The following mapping examples are exemplarily based on the detailed session initiation signaling diagram of FIG. 9. The detailed signaling diagram of FIG. 9 basically corresponds to the first and the last two message exchanges between the HUE 106 and the S-CSCF 112 (via the HIAF 108) of FIG. 5 (with the exception that no SDP answer is transferred via the penultimate message exchange in FIG. 5).

Referring now to FIG. 9, the messaging starts again with the HUE 106 sending a HTTP request message to the HIAF 108. The HTTP request message includes several HTTP cookies to transport different items of information. The cookies 'dialog-id' and 'transaction' constitute (both individually and in their combination) HTTP state information. Since in the present case the messaging is initiated by the HUE 106, the HTTP state information is likewise generated by the HUE 106. The HTTP state information indicates that the HTTP request message is associated with the dialog ali2alice1 and is part of the transaction number 000001. In the present embodiment, SIP requests and the corresponding SIP responses are piggybacked in separate HTTP request and response messages. As there may be more than one outstanding request for the same SIP dialog, the transaction number is used by the HUE 106 as state information to match HTTP responses to their requests, and vice versa.

The dialog-id is in the simplest case the SIP call-id. However, the call-id may also be mapped to another identifier that happens to be more convenient as dialog-id. The transaction counter is an identifier that corresponds to media sessions existing within the SIP dialog. An example would be multiple video streams within one SIP dialog. The transaction counter might in such a case be used to distinguish between these different video streams.

The information item "method" in the body of the first HTTP request message of FIG. 9 indicates that the HUE 106 requests the initiation of an INVITE transaction in relation to a remote SIP User Agent. The SIP address of this User Agent is included in the first line of the GET statement (sip: alice@baba). As shown in FIG. 9, the body of the HTTP request message includes a further information item carrying session description information in the form of an SDP offer.

Based on the information received via the HTTP request message from the HUE 106, the HIAF 108 is informed that an INVITE transaction is requested (method=invite) and that an SDP offer/answer procedure has to be performed. As the resulting session will stretch between the HTTP domain of the HUE 106 on the one hand and the SIP domain of the S-CSCF 112 on the other hand, the HTTP state information needs to be stored by the HIAF 108 in order to allow for a stateful communication with the HUE 106 in the context of this session.

To store the HTTP state information, the HIAF populates local tables based on the HTTP state information received via the HTTP request message from the HUE 106 and the associated SIP dialog ID generated by the dialog administration layer 144 as discussed above in context with FIG. 4. To this end, the HSML 134 of the HIAF 108 maintains two separate mapping tables, namely a Dialog Resolution Table (DRT) 700, as illustrated in FIG. 7, on the one hand and a Transaction Counter Table (TCT) 800, as illustrated in FIG. 8, on the other hand. Both tables are maintained and updated by the HSML 134 for the purpose of mapping HTTP stateful sessions to SIP dialogs as well as for monitoring the progress of SIP transactions and HTTP sessions.

As shown in FIG. 7, the DRT 700 maps the SIP dialog ID as assigned by the dialog administration layer 144 to a HIAF dialog ID (ali2alice1) as received in the present case from the HUE 106. Using any dialog ID contained in the DRT 700, it is possible for the HSML 134 to determine the current state of the dialog and to construct any SIP message necessary for continuing, modifying or terminating the dialog. The dialog state for each dialog is maintained by the SIP User Agent 132 for each dialog involving the HIAF 108.

The TCT 800 shown in FIG. 8 is used by the HSML 134 in conjunction with the DRT 700 of FIG. 7 to produce the appropriate HTTP request and response messages directed to the HUE 106. An entry in the TCT 800 indicates that there is an active transaction between the HUE 106 and the HIAF 108 with a given transaction number. The transaction numbers will be used in signaling exchanged between the HUE and HIAF endpoints in order to complete the transactions. Two transactions within the same SIP dialog should not use the same transaction number, independently of whether these transactions are issued by the HUE 106 or the HIAF 108. It should be noted that in addition to the TCT 800 of the HIAF 108 shown in FIG. 8, the HUE 106 will independently maintain its own transaction counter table in a manner similar to the TCT 800.

Based on the DRT 700 and the TCT 800, the SIP dialog ID can thus be looked-up when knowing the HIAF dialog ID and the transaction number. Each time the HIAF 108 determines that a new dialog is about to be established, it assigns a new HIAF dialog ID and updates the DRT 700 (new SIP dialog ID) and the TCT 800 (new transaction number) accordingly. As shown in FIGS. 7 and 8, the DRT 700 and the TCT 800 may be used to maintain other state data. Such other state data may include SIP branch parameters.

Whenever the HIAF 108 receives an HTTP request message from the HUAC of HUE 106, it performs the following tasks in relation to the DRT 700 and TCT 800. In a first step, the HIAF 108 determines whether the requesting HUE 106 has a valid registration with an outstanding lifetime. To this end, the HIAF 108 searches through its local registration table (as discussed in more detail below) for an entry containing the IP address that has sourced the incoming HTTP request message (i.e., the IP address of the HUE 106). In a next step, the HIAF 108 uses information from the registration table, the DRT 700 and the HTTP request message to construct the required SIP request message. At the same time, the HIAF updates its DRT 700.

In a further step, the HIAF 108 utilizes information acquired from the DRT 700 and the TCT 800 to construct a HTTP response message to the HUE 106. As illustrated in FIG. 9, the HTTP response message carries the code 200 OK. It should be noted that the status code contained in the HTTP response message relates merely to the capacity of the HIAF 108 to execute the contents of the HTTP request, and not to the outcome of the execution. In other words, in the case illustrated in FIG. 9 the status code 200 OK included in the HTTP response message only indicates that the previous HTTP request message is valid, but not that the INVITE message sent by the HIAF 108 to the S-CSCF 112 was successful. If, for any reason, a specific HTTP request cannot be serviced by the HIAF 108, then an HTTP response message with a non-200 status code (e.g., a SIP code 4xx) and an appropriate reason-phrase will be returned to the HUE 106.

Whenever the HIAF 108 receives a SIP message from the IMS network (i.e., from the S-CSCF 112), the following tasks are performed (see FIG. 9). First, it updates the DRT 700 with respect to the SIP message type received and the information contained in the SIP message. The HIAF 108 then uses information from the registration table, the DRT 700 and the TCT 800 to produce a HTTP request that is sent to the HUAS of HUE 106 (see FIG. 9). In a next step, the HIAF 108 receives a HTTP response message from the HUAS of HUE 106. As becomes apparent from FIG. 9, the HTTP state information contained in the HTTP response message is the same as the HTTP state information contained in the HTTP request message initially sent by the HUE 106 to HIAF 108 in context with initiating the requested INVITE transaction.

In the signaling embodiment discussed above in context with FIG. 9, it is assumed that session establishment is triggered from the HTTP domain by the HUE 106. According to an alternative signaling embodiments that will now be discussed with reference to FIGS. 10 and 11, session establishment is triggered by an SIP enabled entity such as the SIP AS 114 illustrated in FIG. 1 or a SIP enabled user equipment.

Figure 10:
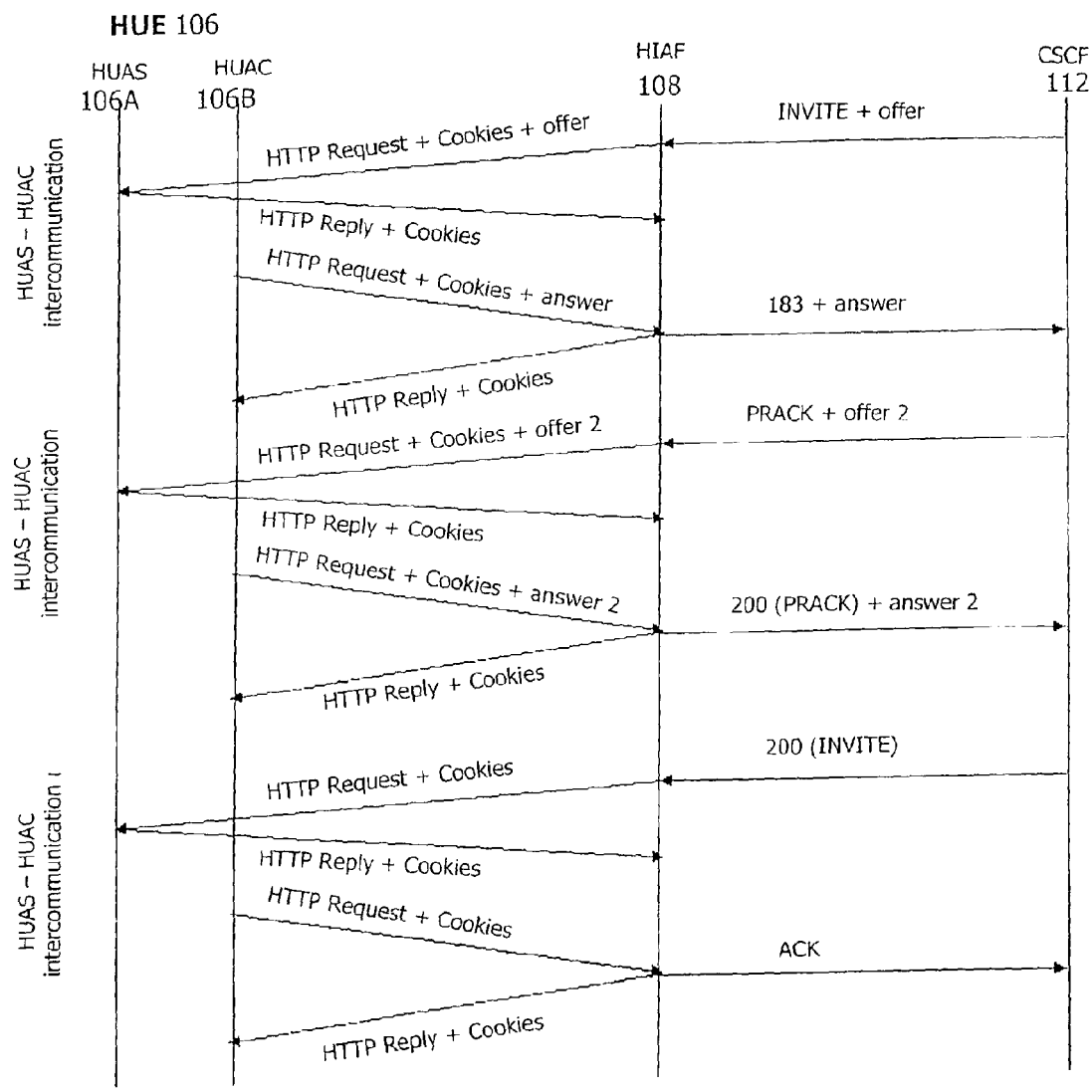
FIG. 10 is a schematic signaling diagram generically illustrating signaling in context with accepting a session invitation.

FIG. 10 illustrates how a complex SDP offer/answer scenario can be realized using the HIAF 108 by mapping SIP request messages onto HTTP request/response messages, and vice versa. Incoming signaling from the SIP enabled entity is passed on by the S-CSCF 112 to the HIAF 108 as illustrated by the INVITE message (that includes an SDP offer) in FIG. 10. In response to receipt of the INVITE message, the HIAF 108 generates appropriate HTTP state information and forwards same together with the SDP offer in a HTTP request message to the HUAS 106A of HUE 106. The HUAS 106 responds with a HTTP response message again including the HTTP state information. The messaging continues with the HUAC 106B of HUE 106 sending a HTTP request message with the HTTP state information and an SDP answer to the HIAF 108. The HIAF 108 maps this HTTP request message into a SIP response (status code 183) including the SDP answer and at the same time acknowledges receipt of the HTTP request message by a HTTP response message to the HUE 106.

Then, the HIAF 108 receives a PRACK message from the S-CSCF 112 and maps this message into a new HTTP request message again including the previously generated HTTP state information as well as a new SDP offer (offer2) as received via the PRACK message. The new HTTP request message sent from the HIAF 108 to the HUAS 106A results in an acknowledgement in the form of a HTTP response message. The further message exchange has similarities with the message exchange discussed above in context with FIG. 5, but in the opposite direction. Similar to the situation illustrated in FIG. 5, internal communication between the HUAS 106A and the HUAC 106B of HUE 106 is required to facilitate the reaction with HTTP request messages sent by the HUAC 106B after reception of HTTP request messages by the HUAS 106A.

Figure 11A:
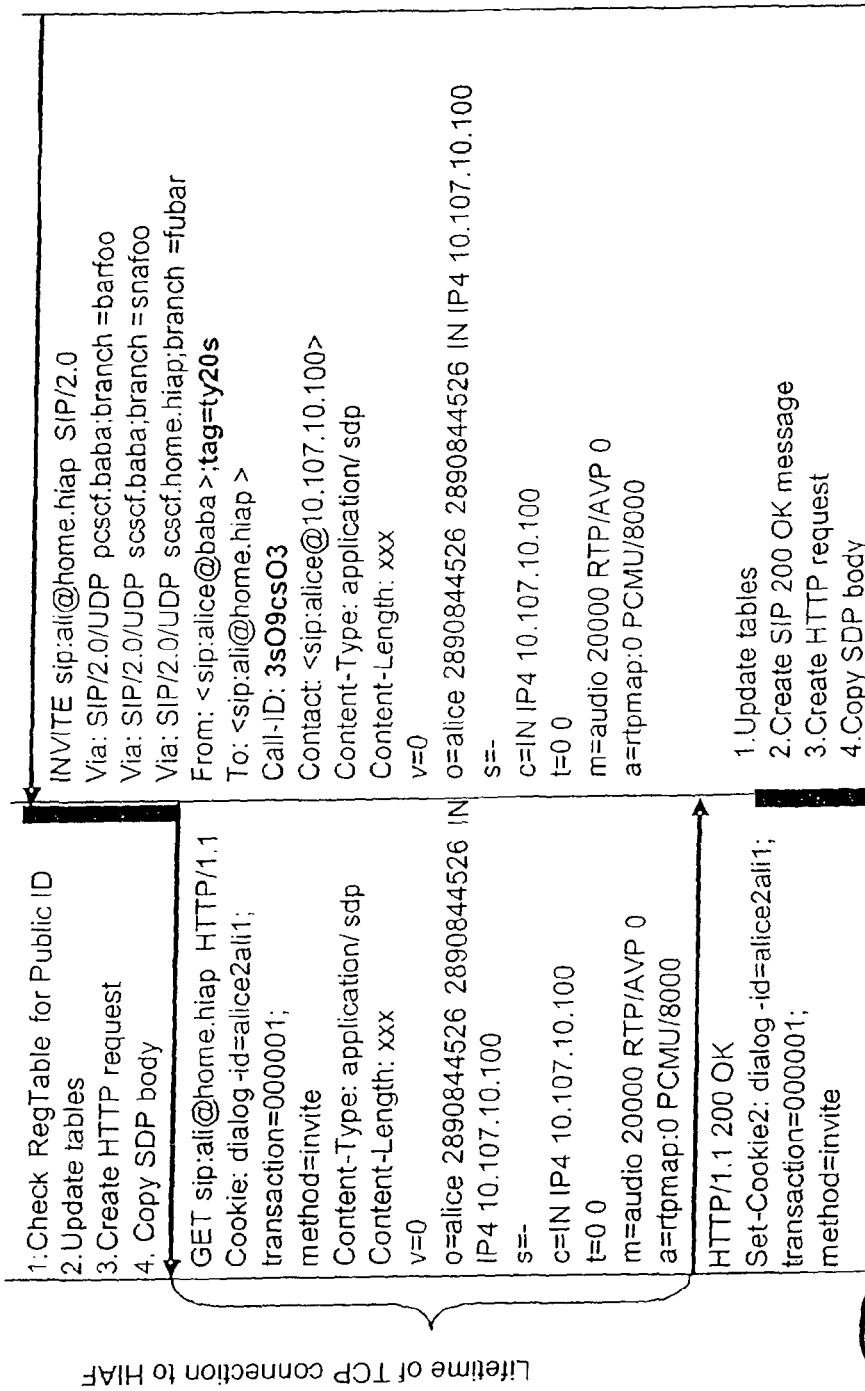
FIG. 11 is a further schematic signaling diagram illustrating in more detail some aspects of accepting a session invitation.
Figure 11B:
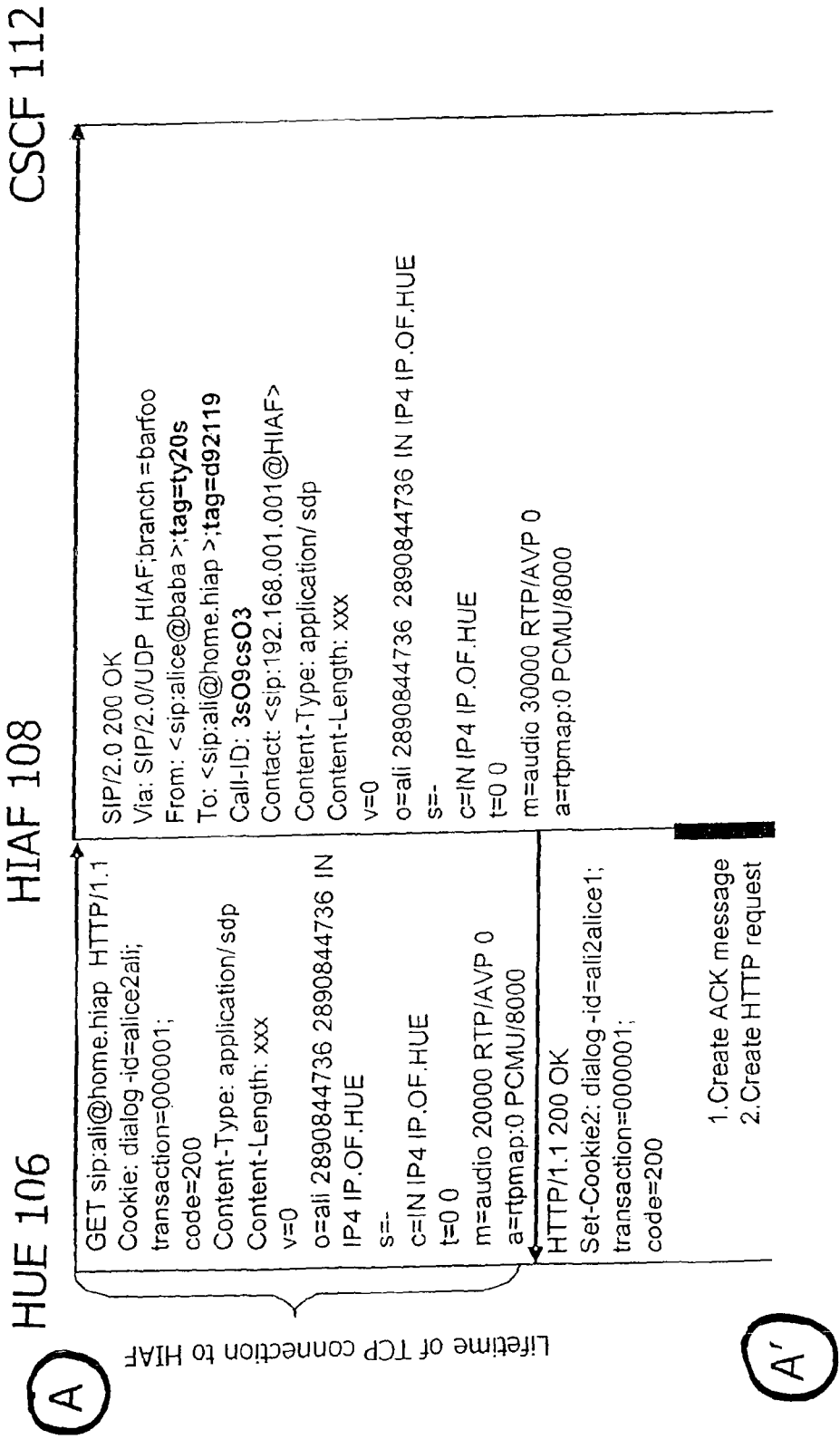
Figure 11C:
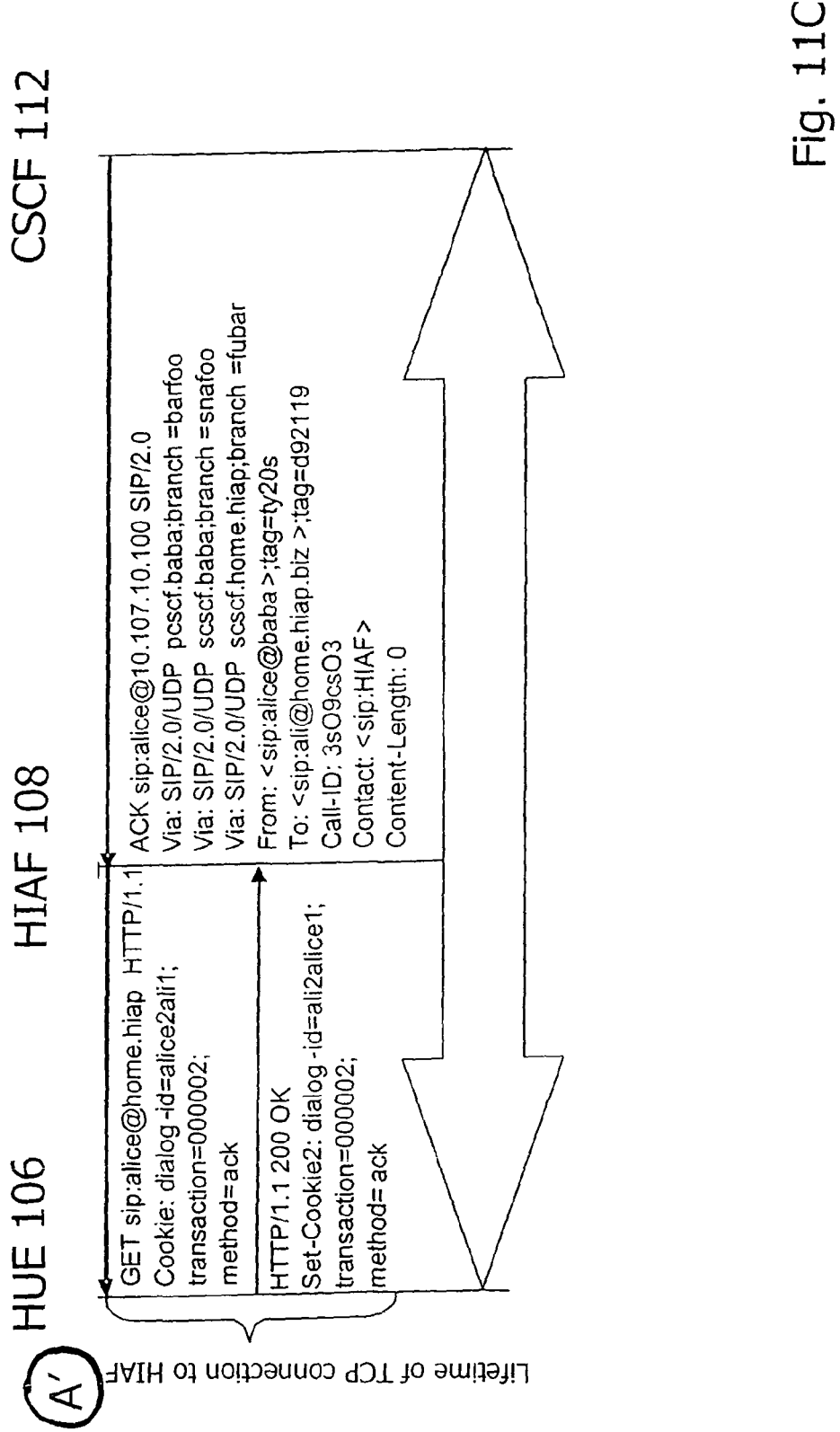

The signaling diagram of FIG. 11 illustrates in more detail the signaling involved with receipt of an INVITE message from the S-CSCF 112 by the HIAF 108 for the scenario in which the HUE 106 is the recipient of a transaction request. The first three messages of FIG. 11 correspond to the first three messages of FIG. 10. The further message exchange illustrated in FIG. 11 has similarities with the message exchange illustrated in FIG. 9, but in the opposite direction. It is believed that based on the explanations given in context with FIG. 9, the signaling diagram of FIG. 11 is to a large extent self-explaining. For this reason, a more detailed discussion thereof is omitted here. It is only noted that the contact information negotiated during the SDP offer/answer model corresponds to the IP address/port pairs allocated by the HUE 106 and SIP endpoints to the particular session. As such, the session is conducted directly between the HUE 106 and SIP endpoints.

Figure 12:
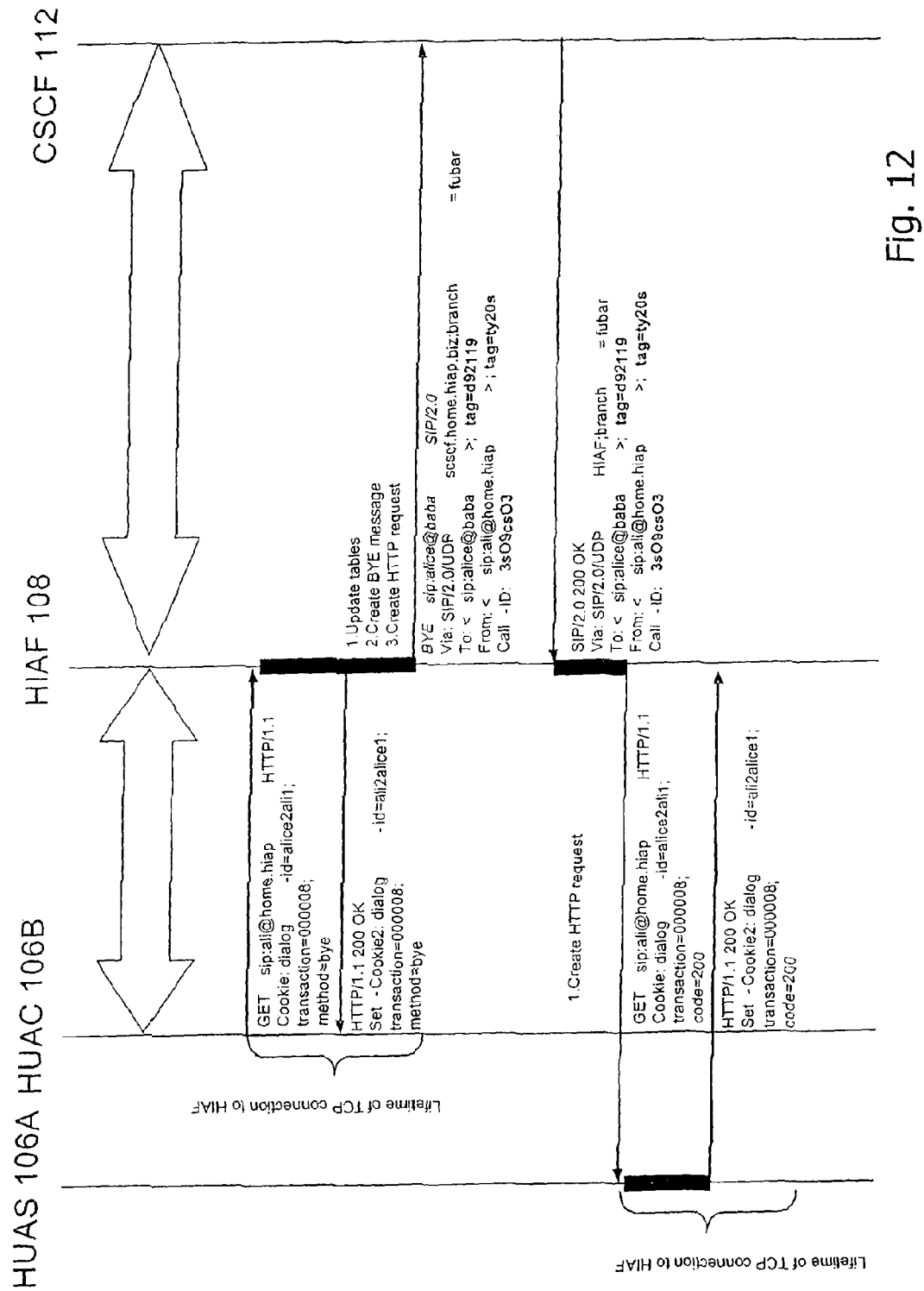
FIG. 12 is a schematic signaling diagram illustrating a first variant of session termination signaling.
Figure 13:
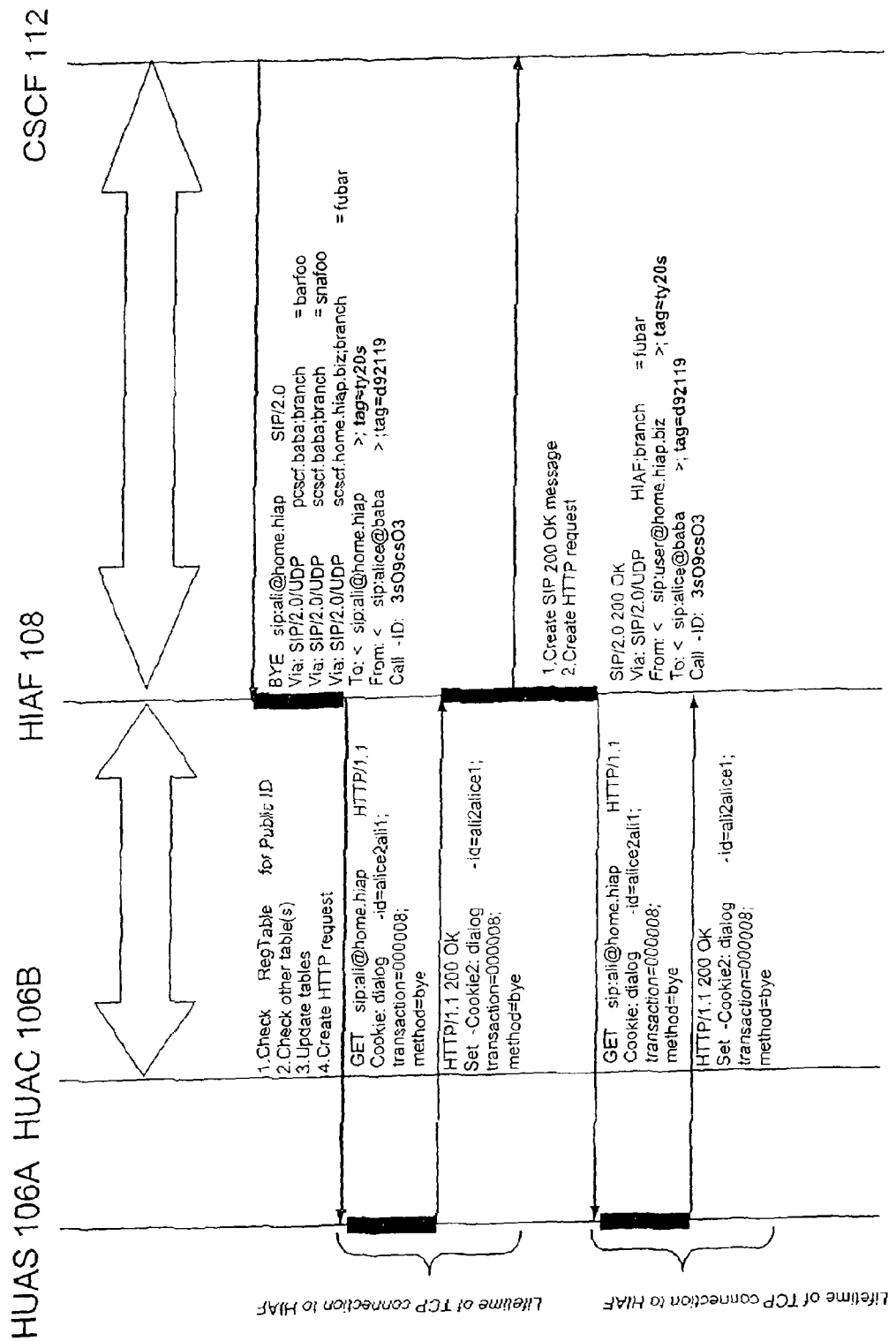
FIG. 13 is a schematic signaling diagram illustrating a second variant of session termination signaling.

The signaling diagrams of FIGS. 12 and 13 illustrate session termination signaling initiated by the HUE 106 on the one hand (FIG. 12) and via the S-CSCF 112 on the other hand (FIG. 13). Session termination in each case involves the transmission of a BYE message either to the S-CSCF 112 or from via S-CSCF 112. The BYE message is in each case accompanied by two pairs of HTTP request and response messages. As becomes apparent from FIGS. 12 and 13, the same HTTP state information (dialog-id=alice2ali1; transaction=000008) is included in each of these four HTTP messages. Based on the HTTP state information, the two pairs of HTTP request and response messages are thus bound to the corresponding SIP dialog as illustrated in the tables of FIGS. 7 and 8.

In the following embodiments, some further HIAF-related aspects that may be implemented in combination with the above embodiments or in a separate manner are explained. Specifically, the technical aspects of HIAF discovery, HIAF media transcoding, HIAF authentication and HIAF registration messages are discussed.

HIAF discovery involves the determination of the address of the HIAF 108 in the HIAnet 104 (see FIG. 1). When the HUE 108 deploys the General Packet Radio Service (GPRS) as the means of network access, the address of the HIAF 108 can be determined during the activation of the general or signaling Packet Data Protocol (PDP) context. Potentially, a new Access Point Name (APN) may need to be defined for HTTP IMS Access PDP context activation.

Alternatively, the HUE 108 can use the Dynamic Host Configuration Protocol (DHCP) to discover the HIAF 108. If the address of the HIAF 108 is returned by DHCP as a Fully Qualified Domain Name (FQDN), then the IP address of the HIAF 108 can be acquired through the Domain Name System (DNS) as is well-known in the art. As a further possibility, the HIAF 108 may automatically be discovered with the help of a Proxy Autoconfiguration Protocol (PAD) such as the Web Proxy Autodiscovery Protocol (WPAD) or the Proxy Auto-Config (PAC) standard.

The HIAF 108 may also perform media transcoding operations. During the negotiation of a media session format, the HIAF 108 may declare itself as the recipient of the media session. As a result, the media session is received by the HIAF 108, and the HIAF 108 performs media transcoding into a session format that has been previously negotiated between (or preconfigured at) the HIAF 108 and the HUE 106. After the transcoding operation, the new media session is delivered to the HUE 106. Such a HIAF-based media transcoding helps to reduce processing load and complexity on the side of the HUE 106.

Now, various authentication and registration-related aspects that precede an actual media session will be discussed in more detail.

HTTP offers an authentication framework with support for a basic scheme (basic authentication) and a scheme based on cryptographic hashes (digest access authentication) both implementing a challenge-response authentication mechanism. In basic authentication, a User Agent Client will respond to a User Agent Server challenge by issuing a base64 encoded string containing its username and password. The fact that basic authentication dictates the transmission of user credentials almost in clear text makes this authentication scheme unsuitable for certain applications. In digest access authentication, the User Agent Client is challenged with a nonce and asked to return a string produced by applying a digest algorithm with a shared secret onto the nonce and a set of data.

A HUE 106 that wishes to be reachable on a SIP URI or to enjoy IMS value-added services has initially to perform IMS registration. To this end, the HIAF 108 may, for example, provide the Trusted Gateway authentication mode.

Generally, HIAF registration involves a HTTP registration conducted between the HUE 106 and the HIAF 108, and an SIP registration conducted between the HIAF 108 and the IMS network 102. In the Trusted Gateway authentication mode, the HIAF 108 authenticates each HUE 106 via HTTP authentication (e.g., using basic or digest access authentication) and confirms to the IMS network 102 the authenticity of the HUE 106. In this operational mode, the HIAF 108 is authorized to act on behalf of the HUE 106 and to source (or respond to) SIP registration requests and responses exchanged with the IMS network 102. The HTTP and SIP registrations on both sides of the HIAF 108 are independent from each other. This means that a successful HTTP registration does not necessarily mean that the SIP registration will likewise be successful.

In the following, the content of HIAF registration messages as well as the basic steps of the Trusted Gateway authentication method will be discussed in more detail. In this regard it will be assumed that the SIP domain is considering the HIAF 108 as trusted. Consequently, all registration requests coming from the HIAF 108 will automatically be accepted. However, the HIAF 108 does not trust the HUEs 106, which thus have to be authenticated.

Figure 14A:
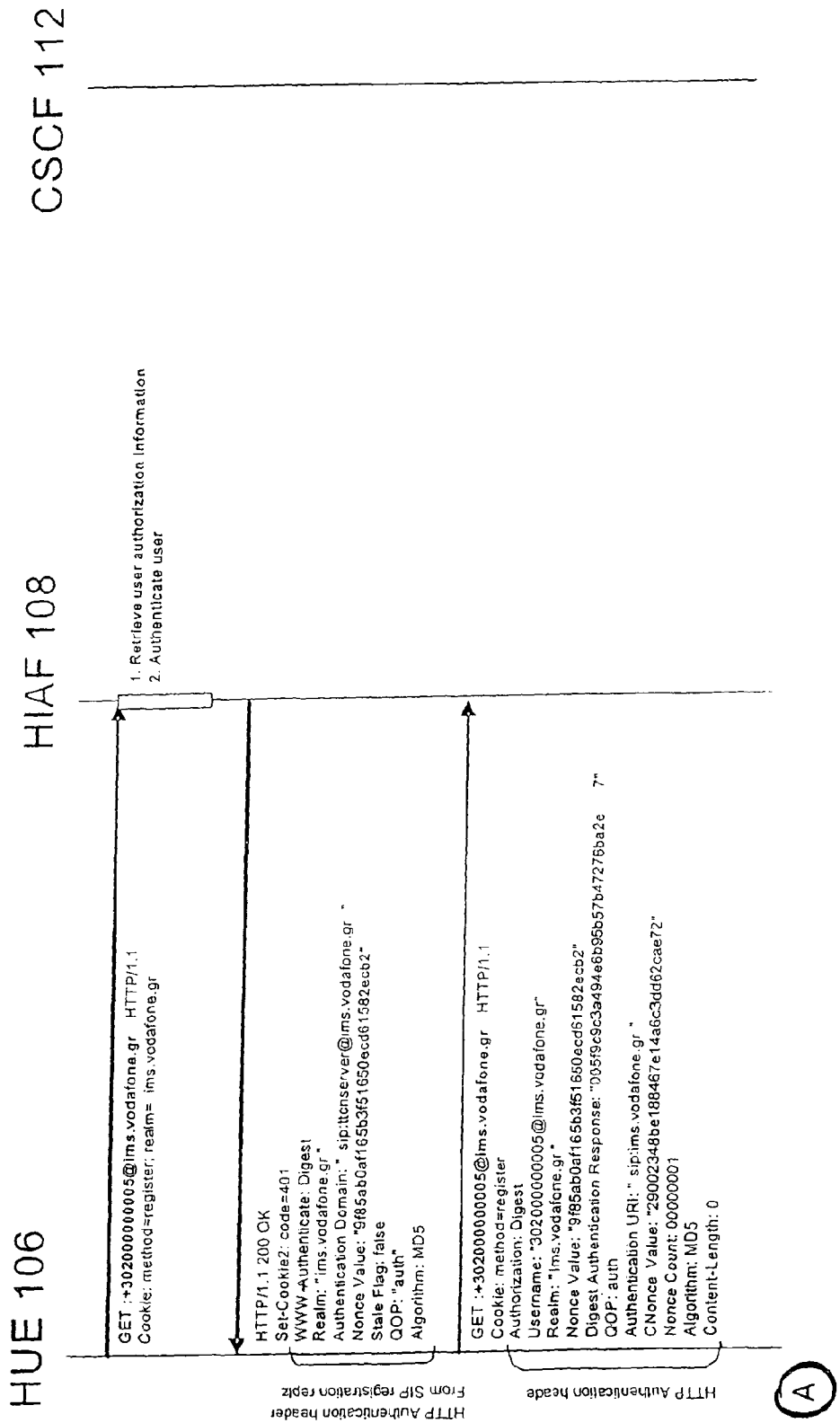
FIG. 14 is a schematic signaling diagram illustrating Trusted Gateway registration signaling.
Figure 14B:
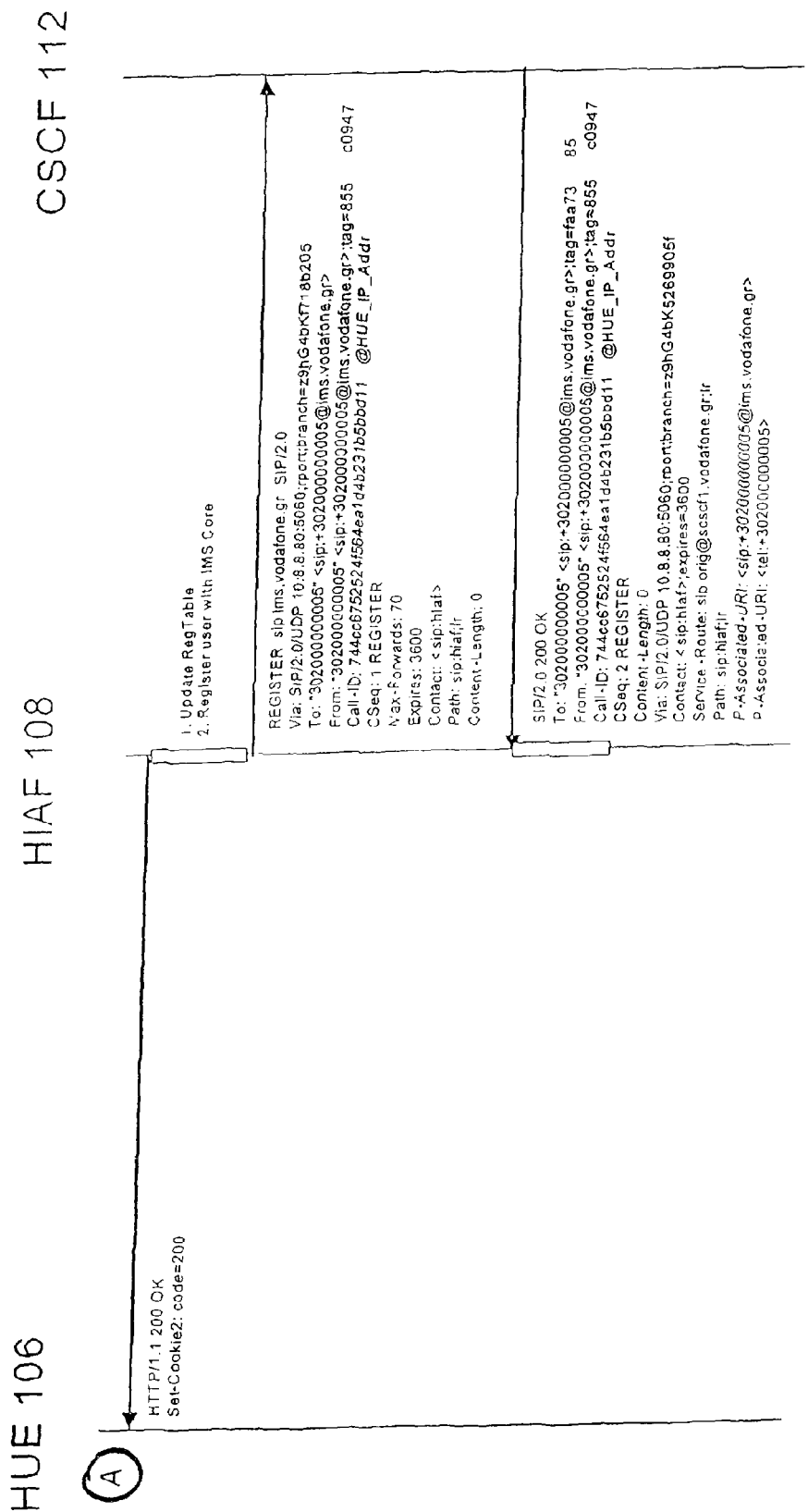

Each HIAF registration request from a HUE 106 includes an HTTP request message that contains information indicating that the HTTP session is entering the registration state. A possible HTTP request message sent from the HUE 106 to the HIAF 108 is shown in the schematic signaling diagram of FIG. 14 illustrating Trusted Gateway HIAF registration. As becomes apparent from the first HTTP request message in this signaling diagram, the HUE 106 is using the cookie "method=register" to notify the HIAF 108 that the HTTP session is entering the registration state.

The registration reply of the HIAF 108 is an HTTP response message. If the status code of the HTTP response message is 200 OK as illustrated in FIG. 14, then the HIAF registration request has been successfully processed. In such a case, the corresponding HTTP response message will also contain information indicating the new state entered by the HTTP session. In the example given in FIG. 14, the HIAF 108 is issuing a HTTP request message including the cookie "code=401". This cookie indicates to the HUE 106 that it has to authenticate itself to the IMS network 102. The code value of 401 corresponds to the status code of the SIP response message received by the HIAF 108.

It should be noted that the HUE 106 and the HIAF 108 do not face the problem of having to determine a match between HIAF registration request and response messages since these messages are transported over one and the same TCP connection. For this reason, no stateful HTTP session needs to be initiated.

In the following, an example of a Trusted Gateway authentication process will be described in more detail with reference to the signaling diagram of FIG. 14 and the tables of FIGS. 15 and 16. In a present embodiment HIAF registration with Trusted Gateway authorization is based on the following assumptions:

1. Authorization information has been a priori established between the HUE 106 and the HIAF 108. That is, the HUE 106 is in a position to authenticate itself with the HIAF 108 using either basic or digest authentication.
2. The HIAF 108 maintains a subscriber table 1500 as shown in FIG. 15 that maps HUE authentication user names to IMS subscribers. The subscriber table 1500 contains all the necessary fields with which the HUE 106 can be authenticated. The authentication scheme column of table 1500 indicates the specific method by which the user should be authenticated. The remaining columns are used to construct the authentication header (with which the user is challenged) and to verify the validity of user response.

Trusted Gateway authentication basically comprises two parts. During the first part, the HUE 106 is authenticated with the HIAF 108. The specific HTTP authentication method used in this regard depends on the subscriber profile as defined in the subscriber table 1500. For example, a subscriber with the table entry "digest" in the authentication scheme column will be authenticated using digest authentication.

Now referring to the signaling diagram of FIG. 14, upon receipt of the initial HTTP request message, the HSML 134 of the HIAF 108 (see FIG. 2) performs the following steps. In a first step, the HSML 134 evaluates the cookie in the HTTP request message and determines the purpose of the HTTP request message that has been received. The cookie "method=register" indicates that this message is a HIAF registration request. In a next step, and using the content of the request URI in the request line of the HIAF registration request, the HSML 134 performs a look up in the subscriber table 1500 to acquire the subscriber profile. In a next step, the HSML 134 performs access authentication with respect to the authentication method defined for the subscriber in the subscriber table 1500.

Once authentication has been successfully performed and before transmission of the HTTP response message (200 OK) to the HUE 106, the HIAF 108 creates an entry for the user in a HIAF registration table 1600 as illustrated in FIG. 16.

The registration table 1600 has several columns. The Authentication Username column indicates the Authentication Username used by the HUE 106 during HIAF registration. The Public User ID column indicates the corresponding ID of the subscriber and may be reserved for future use. The Home Domain column of the HUE 106 is populated with the corresponding content of the authentication header in the HIAF registration request message. The IP Address column is populated with the IP Address of the HUE 106. This address is generally derived from the source IP Address of incoming HIAF registration request messages. The Status column indicates the Status of HIAF registrations and the Lifetime column indicates the Lifetime of HIAF registrations.

After each successful authentication, a new entry in the HIAF registration table 1600 is created and populated as follows. The Authentication Username and Home Domain fields are populated with the values used by the subscriber during authentication. The Public User ID list is kept empty and reserved for future use. The IP address field is set to the address used by the HUE 106 during HIAF registration. The Status Field is set to REGISTERED and the lifetime is left empty.

The HIAF 108 then constructs a SIP REGISTER message (see FIG. 14) populating the individual message field as follows. The From and To fields are populated with the value given for the Request URI in the HIAF registration request. A new Call-ID is created that may contain at its bottom the IP address of the HUE 106. This Call-ID has to be recorded in the respective entries of the registration table 1600. The Contact field is populated with the own SIP URI of the HIAF 108. This is basically the address where the HIAF 108 wishes to receive future session invitations for this subscriber. In a further step, a Path header is added indicating its own SIP URI leading the IMS network 102 to believe that the HIAF 108 is acting as P-CSCF 110 for an IMS subscriber (see FIG. 1).

For every SIP registration response message received from the IMS network 102, the HSML 134 of the HIAF 108 performs the following actions. In a first step, the HSML 134 updates the lifetime value of the respective entry in the registration table 1600 to the corresponding value in the SIP registration response message. It then constructs an HTTP response message with a 200 OK status line containing the cookie "lifetime=xxxx" in its message body. This cookie indicates to the HUE 106 the lifetime of the HIAF registration.

As has become apparent from the above embodiments, the techniques presented herein permit HTTP enabled user equipment to initiate, conduct and terminate sessions with an SIP User Agent based on mappings that are established between SIP dialogs and HTTP stateful sessions. The session paradigm can thus be extended into the HTTP domain, which increases the overall inter-operability of networks relying on different application layer protocols. Signaling conversion can efficiently be performed at an interface between the HTTP and SIP domains.

In the foregoing, the principles, preferred embodiments and various modes of implementing the techniques disclosed herein have been described. However, the present invention should not be construed as being limited to the particular principles, embodiments and modes discussed above. It will thus be appreciated that variations and modifications may be made by a person skilled in the art without departing from the scope of the present invention as defined by the following claims.

The invention claimed is:

1. A method of performing signaling conversion between a Hypertext Transfer Protocol (HTTP) stateful session and a Session Initiation Protocol (SIP) dialog, comprising:
   receiving from an HTTP enabled entity a first HTTP request message, the first HTTP request message including HTTP state information;
   creating a first SIP message in response to receipt of the first HTTP request message, the first SIP message belonging to an SIP dialog;
   sending the first SIP message to an SIP enabled entity;
   establishing a mapping between the HTTP state information and the SIP dialog;
   receiving a second SIP message;
   determining the SIP dialog to which the second SIP message belongs;
   determining the HTTP state information associated with the SIP dialog;
   generating a second HTTP request message including or referencing the HTTP state information thus determined; and
   sending the second HTTP request message to the HTTP enabled entity.

2. The method of claim 1, further comprising returning a first HTTP response message to the HTTP enabled entity.

3. The method of claim 1, further comprising receiving a second HTTP response message responsive to the second HTTP request message from the HTTP enabled entity.

4. The method of claim 1, wherein based on the HTTP state information, the pair of first HTTP request and response messages as well as the pair of second HTTP request and response messages are grouped into the HTTP stateful session.

5. The method of claim 1, wherein the first HTTP request message further includes address information indicative of an SIP User Agent of the SIP enabled entity, and wherein the address information is used to address the first SIP message to the SIP User Agent.

6. The method of claim 1, wherein the first HTTP request message further includes HTTP dialog information, and wherein the HTTP dialog information is mapped to SIP dialog information.

7. The method of claim 1, wherein the first HTTP request message further includes session description information, and further comprising inserting the session description information included in the first HTTP request message into the first SIP message.

8. The method of claim 7, wherein the session description information is sent in a Session Description Protocol (SDP) offer/answer context.

9. The method of claim 1, wherein the state information is included in at least one of the first HTTP request message and the second HTTP request message in the form of at least one of an HTTP cookie, a Fat Universal Resource Locator (Fat URL) an HTTP parameter and a query component.

10. The method of claim 1, wherein the first HTTP request message includes an SIP message indication indicative of at least one of an SIP method, an SIP code and an HTTP status code.

11. A method of performing signaling conversion between a Session Initiation Protocol (SIP) dialog and a Hypertext Transfer Protocol (HTTP) stateful session, comprising:
   receiving from an SIP enabled entity a first SIP message, the first SIP message belonging to an SIP dialog;
   establishing a mapping between HTTP state information and the SIP dialog;
   creating a first HTTP request message indicative of a content of the first SIP message, the first HTTP request message including the HTTP state information mapped on the SIP dialog;
   sending the first HTTP request message to an HTTP enabled entity;
   receiving a second HTTP request message, the second HTTP request message including the HTTP state information and an optional indication of a second SIP message that is to be created;
   determining the SIP dialog mapped on the HTTP state information;
   creating a second SIP message in response to receipt of the second HTTP request message based on the optional indication in the second HTTP request message and the determined SIP dialog; and
   sending the second SIP message to the SIP enabled entity.

12. The method of claim 11, further comprising receiving a first HTTP response message responsive to the first HTTP request message from the HTTP enabled entity.

13. The method of claim 11, further comprising returning a second HTTP response message to the HTTP enabled entity.

14. The method of claim 11, wherein based on the HTTP state information the pair of first HTTP request and response messages as well as the pair of second HTTP request and response messages are grouped into the HTTP stateful session.

15. The method of claim 11, further comprising generating the HTTP state information in response to receipt of the first SIP message.

16. The method of claim 1, wherein the HTTP enabled entity is a user equipment or the SIP enabled entity is an Internet Protocol Multimedia Subsystem (IMS) entity.

17. The method of claim 1, wherein the SIP dialog is performed in one of a user registration context, a session initiation context and a session termination context.

18. An apparatus for performing signaling conversion between a Hypertext Transfer Protocol (HTTP) stateful session and a Session Initiation Protocol (SIP) dialog, comprising:
   an HTTP User Agent adapted to receive from an HTTP enabled entity a first HTTP request message, the first HTTP request message including HTTP state information;
   an SIP User Agent adapted to send a first SIP message to an SIP enabled entity in response to receipt of the first HTTP request message, the first SIP message belonging to an SIP dialog; and
   a mapping logic adapted to establish a mapping between the HTTP state information and the SIP dialog,
   wherein the SIP User Agent is further adapted to receive a second SIP message,
   wherein the mapping logic is further adapted to determine the SIP dialog to which the second SIP message belongs and to determine the HTTP state information associated with the SIP dialog, and
   wherein the HTTP User Agent is further adapted to generate a second HTTP request message including or referencing the HTTP state information thus determined and to send the second HTTP request message to the HTTP enabled entity.

19. The apparatus of claim 18, wherein the HTTP User Agent is further adapted to return a first HTTP response message to the HTTP enabled entity.

20. An apparatus for performing signaling conversion between a Session Initiation Protocol (SIP) dialog and a Hypertext Transfer Protocol, or HTTP, stateful session, comprising:
- an SIP User Agent adapted to receive from an SIP enabled entity a first SIP message, the first SIP message belonging to an SIP dialog;
- a mapping logic adapted to establish a mapping between HTTP state information and the SIP dialog;
- an HTTP User Agent adapted to send a first HTTP request message indicative of a content of the first SIP message to an HTTP enabled entity, the first HTTP request message including the HTTP state information mapped on the SIP dialog,
- wherein the HTTP User Agent is further adapted to receive a second HTTP message, the second HTTP request message including the HTTP state information and an optional indication of a second SIP message that is to be created,
- wherein the mapping logic is further adapted to determine the SIP dialog mapped on the HTTP state information and to create a second SIP message in response to receipt of the second HTTP request message based on the optional indication in the second HTTP request message and the determined SIP dialog, and
- wherein the SIP User Agent is further adapted to send the second SIP message to the SIP enabled entity.

21. The apparatus of claim 20, wherein the HTTP User Agent is further adapted to receive a first HTTP response message responsive to the first HTTP request message from the HTTP enabled entity.

22. The apparatus of claim 18, configured as a Web proxy.

23. The A method of performing signaling conversion between a Hypertext Transfer Protocol (HTTP) stateful session and a Session Initiation Protocol (SIP) dialog, comprising:
- receiving from an HTTP enabled entity a first HTTP request message, the first HTTP request message including HTTP state information;
- creating a first SIP message in response to receipt of the first HTTP request message, the first SIP message belonging to an SIP dialog;
- sending the first SIP message to an SIP enabled entity; and
- establishing a mapping between the HTTP state information and the SIP dialog,
    - wherein the HTTP enabled entity is a user equipment or the SIP enabled entity is an Internet Protocol Multimedia Subsystem (IMS) entity, and
    - wherein the SIP dialog is performed in one of a user registration context, a session initiation context and a session termination context.

24. A method of performing signaling conversion between a Session Initiation Protocol (SIP) dialog and a Hypertext Transfer Protocol (HTTP) stateful session, comprising:
- receiving from an SIP enabled entity a first SIP message, the first SIP message belonging to an SIP dialog;
- establishing a mapping between HTTP state information and the SIP dialog;
- creating a first HTTP request message indicative of a content of the first SIP message, the first HTTP request message including the HTTP state information mapped on the SIP dialog; and
- sending the first HTTP request message to an HTTP enabled entity,
    - wherein the HTTP enabled entity is a user equipment or the SIP enabled entity is an Internet Protocol Multimedia Subsystem (IMS) entity, and
    - wherein the SIP dialog is performed in one of a user registration context, a session initiation context and a session termination context.

25. An apparatus for performing signaling conversion between a Hypertext Transfer Protocol (HTTP) stateful session and a Session Initiation Protocol (SIP) dialog, comprising:
- an HTTP User Agent adapted to receive from an HTTP enabled entity a first HTTP request message, the first HTTP request message including HTTP state information;
- an SIP User Agent adapted to send a first SIP message to an SIP enabled entity in response to receipt of the first HTTP request message, the first SIP message belonging to an SIP dialog; and
- a mapping logic adapted to establish a mapping between the HTTP state information and the SIP dialog,
    - wherein the HTTP enabled entity is a user equipment or the SIP enabled entity is an Internet Protocol Multimedia Subsystem (IMS) entity, and
    - wherein the SIP dialog is performed in one of a user registration context, a session initiation context and a session termination context.

26. An apparatus for performing signaling conversion between a Session Initiation Protocol (SIP) dialog and a Hypertext Transfer Protocol, or HTTP, stateful session, comprising:
- an SIP User Agent adapted to receive from an SIP enabled entity a first SIP message, the first SIP message belonging to an SIP dialog;
- a mapping logic adapted to establish a mapping between HTTP state information and the SIP dialog;
- an HTTP User Agent adapted to send a first HTTP request message indicative of a content of the first SIP message to an HTTP enabled entity, the first HTTP request message including the HTTP state information mapped on the SIP dialog,
    - wherein the HTTP enabled entity is a user equipment or the SIP enabled entity is an Internet Protocol Multimedia Subsystem (IMS) entity, and
    - wherein the SIP dialog is performed in one of a user registration context, a session initiation context and a session termination context.

* * * * *